United States Patent
Aoyama et al.

(10) Patent No.: US 6,700,355 B2
(45) Date of Patent: Mar. 2, 2004

(54) METHOD FOR CONTROLLING A VEHICULAR GENERATOR, AN EXTERNAL CONTROLLER AND A VEHICULAR POWER GENERATION CONTROLLING DEVICE

(75) Inventors: Tooru Aoyama, Kariya (JP); Koji Tanaka, Kariya (JP)

(73) Assignee: Denso Corporation, Kariya (JP)

(*) Notice: Subject to any disclaimer, the term of this patent is extended or adjusted under 35 U.S.C. 154(b) by 217 days.

(21) Appl. No.: 09/986,113

(22) Filed: Nov. 7, 2001

(65) Prior Publication Data

US 2002/0057074 A1 May 16, 2002

(30) Foreign Application Priority Data

Nov. 10, 2000 (JP) ........................................ 2000-343646

(51) Int. Cl.$^7$ ............................. H02H 7/06; H02P 11/00; H02P 9/00
(52) U.S. Cl. .............................. 322/36; 322/17; 322/27; 322/28
(58) Field of Search ............................. 322/17, 27–28, 322/36

(56) References Cited

U.S. PATENT DOCUMENTS

| | | | | |
|---|---|---|---|---|
| 4,262,242 A | * | 4/1981 | Glennon ........................ 322/28 |
| 4,618,811 A | * | 10/1986 | Mashino et al. .............. 322/28 |
| 4,651,081 A | * | 3/1987 | Nishimura et al. .......... 320/123 |
| 4,689,545 A | * | 8/1987 | Komurasaki et al. ........ 322/14 |
| 5,140,253 A | * | 8/1992 | Itoh .............................. 322/28 |
| 5,144,220 A | * | 9/1992 | Iwatani et al. ............... 322/28 |
| 5,352,971 A | | 10/1994 | Nishimura .................... 322/27 |
| 5,491,400 A | * | 2/1996 | Iwatani et al. ............... 322/28 |
| 5,497,071 A | * | 3/1996 | Iwatani et al. ............... 322/28 |
| 5,581,172 A | | 12/1996 | Iwatani et al. ............... 322/28 |
| 5,672,954 A | * | 9/1997 | Watanabe ..................... 322/28 |
| 5,886,500 A | * | 3/1999 | Iwatani et al. ............... 320/104 |
| 5,923,151 A | * | 7/1999 | Satoh ........................... 322/28 |
| 5,986,439 A | * | 11/1999 | Pletta et al. .................. 322/59 |
| 6,060,866 A | * | 5/2000 | Sada et al. ................... 322/59 |
| 6,111,390 A | * | 8/2000 | Inaba et al. .................. 322/28 |
| 6,121,757 A | * | 9/2000 | Takahashi et al. ........... 322/28 |
| 6,181,111 B1 | * | 1/2001 | Hoffman et al. ............. 322/28 |
| 6,344,734 B1 | * | 2/2002 | Iwatani et al. ............... 322/28 |

(List continued on next page.)

FOREIGN PATENT DOCUMENTS

| | | |
|---|---|---|
| DE | 199 29 060 C1 | 10/2000 |
| EP | 0 299 807 A2 | 1/1989 |
| EP | 0 438 884 A1 | 7/1991 |
| JP | A 5-122999 | 5/1993 |
| JP | A 6-38398 | 2/1994 |
| JP | B2 6-83550 | 10/1994 |
| JP | A 6-311799 | 11/1994 |
| JP | A 7-289000 | 10/1995 |
| JP | A 8-98430 | 4/1996 |
| JP | A 8-289596 | 11/1996 |
| JP | B2 3070788 | 5/2000 |

*Primary Examiner*—Nestor Ramirez
*Assistant Examiner*—Pedro J. Cuevas
(74) *Attorney, Agent, or Firm*—Oliff & Berridge, PLC

(57) ABSTRACT

When a transistor is turned ON, a predetermined voltage VCL is applied to a minus terminal of a voltage comparator through a C terminal. A predetermined voltage Vd (Vd>VCL) is applied to a plus terminal of the voltage comparator, and an output of the voltage comparator changes from a low level to a high level. Such change is detected by a trigger detection circuit so as to activate a timer circuit, and an output of the timer circuit transitions to the high level during a predetermined time. Thereby, a transistor is changed to an on-state, a reference voltage Vb of an adjustment voltage applied to a plus terminal of a voltage comparator is set generally to 0V, and a transistor is turned OFF, so as to temporarily suspend a power generation state of a vehicular generator.

15 Claims, 23 Drawing Sheets

U.S. PATENT DOCUMENTS

| | | | |
|---|---|---|---|
| 6,420,855 B2 * | 7/2002 | Taniguchi et al. | 322/28 |
| 6,424,127 B1 * | 7/2002 | Ishii | 322/36 |
| 6,486,638 B1 * | 11/2002 | Sumimoto et al. | 322/28 |
| 6,486,640 B2 * | 11/2002 | Adams | 322/59 |
| 6,534,959 B1 * | 3/2003 | Anderson et al. | 322/28 |
| 6,548,990 B2 * | 4/2003 | Okuno et al. | 322/36 |
| 6,555,992 B2 * | 4/2003 | Asao et al. | 322/28 |
| 6,555,993 B2 * | 4/2003 | Taniguchi et al. | 322/28 |
| 6,555,994 B1 * | 4/2003 | Keane et al. | 322/36 |

* cited by examiner

FIG. 2A TRANSISTOR (25)
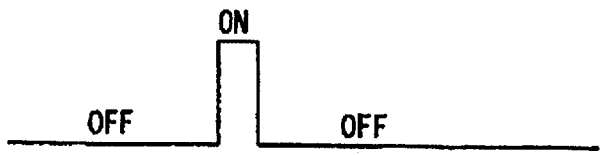
FIG. 2B C TERMINAL VOLTAGE
FIG. 2C OUTPUT OF VOLTAGE COMPARATOR (113)
FIG. 2D OUTPUT OF TRIGGER DETECTION CIRCUIT
FIG. 2E OUTPUT OF TIMER CIRCUIT
FIG. 2F ADJUSTMENT VOLTAGE
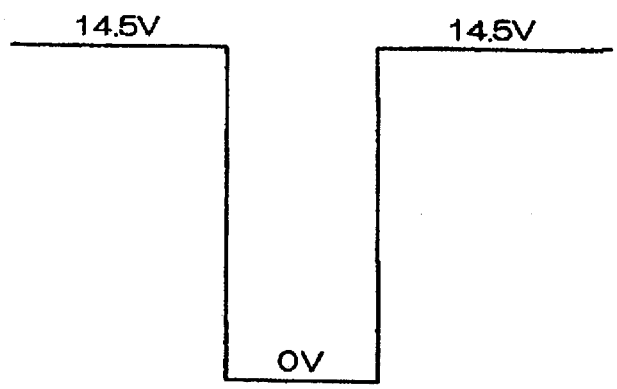

TRANSISTOR (25)

C TERMINAL VOLTAGE

OUTPUT OF VOLTAGE COMPARATOR (113)

OUTPUT OF TRIGGER DETECTION CIRCUIT

OUTPUT OF TIMER CIRCUIT

TRANSISTOR (122)

TRANSISTOR (129)

ADJUSTMENT VOLTAGE

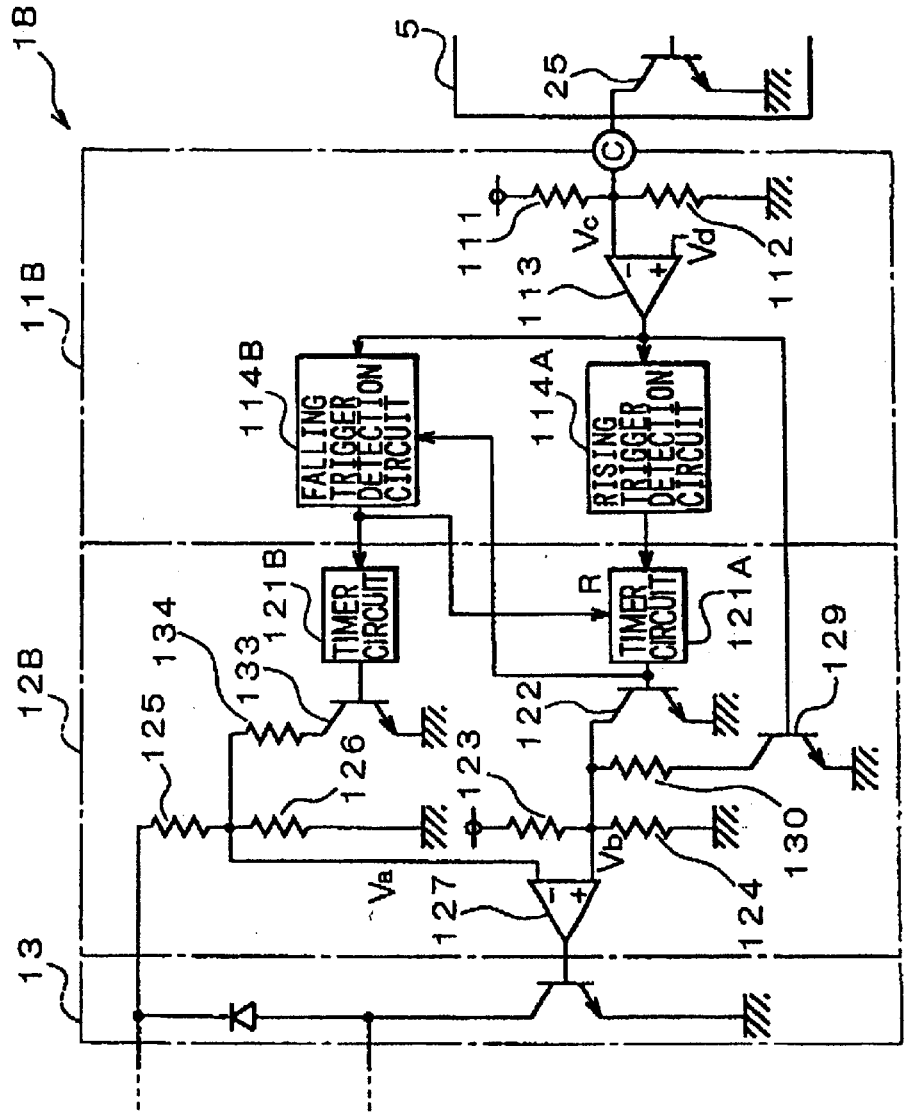

FIG. 7A  TRANSISTOR (25)
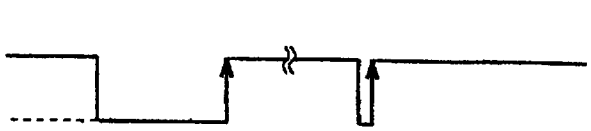
FIG. 7B  C TERMINAL VOLTAGE
FIG. 7C  OUTPUT OF VOLTAGE COMPARATOR (113)
FIG. 7D  OUTPUT OF TRIGGER DETECTION CIRCUIT (114A)
FIG. 7E  OUTPUT OF TIMER CIRCUIT (121A)
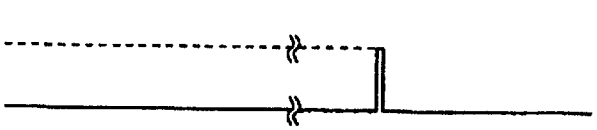
FIG. 7F  OUTPUT OF TRIGGER DETECTION CIRCUIT (114B)
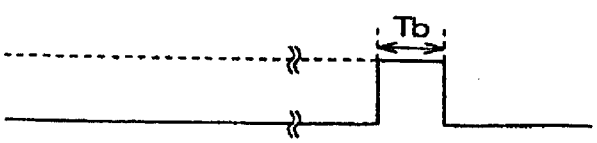
FIG. 7G  OUTPUT OF TIMER CIRCUIT (121B)
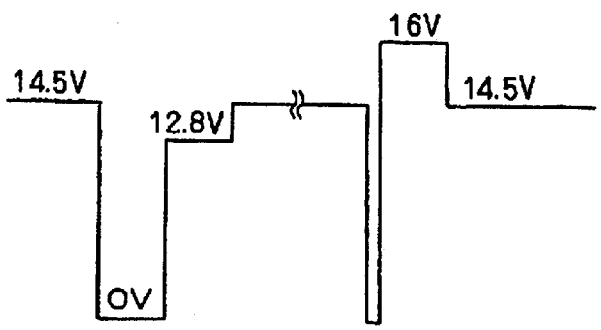
FIG. 7H  ADJUSTMENT VOLTAGE FIG. 8A TRANSISTOR (25)
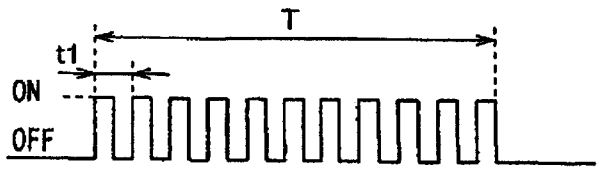
FIG. 8B C TERMINAL VOLTAGE
FIG. 8C OUTPUT OF VOLTAGE COMPARATOR (113)
FIG. 8D OUTPUT OF TRIGGER DETECTION CIRCUIT
FIG. 8E TIMER CIRCUIT
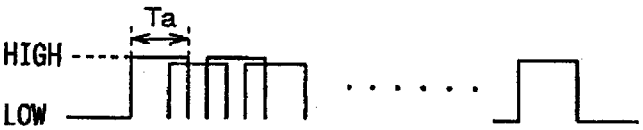
FIG. 8F OUTPUT OF TIMER CIRCUIT
FIG. 8G ADJUSTMENT VOLTAGE

FIG. 10A C TERMINAL VOLTAGE
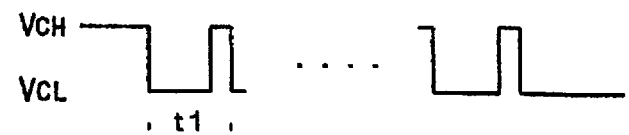
FIG. 10B OUTPUT OF VOLTAGE COMPARATOR (113)
FIG. 10C OUTPUT OF CHANGE SIGNAL DETECTION CIRCUIT (210)
FIG. 10D CAPACITOR (224)
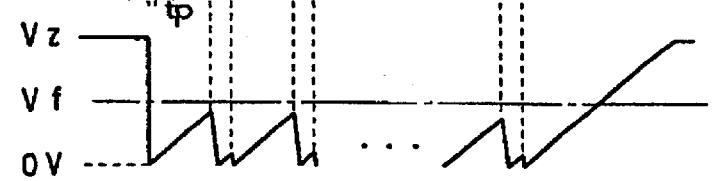
FIG. 10E OUTPUT OF VOLTAGE COMPARATOR (226)
FIG. 10F OUTPUT OF NOR CIRCUIT (228)
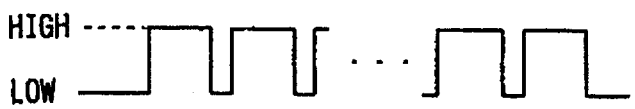
FIG. 10G OUTPUT OF NOR CIRCUIT (227)
FIG. 10H ADJUSTMENT VOLTAGE
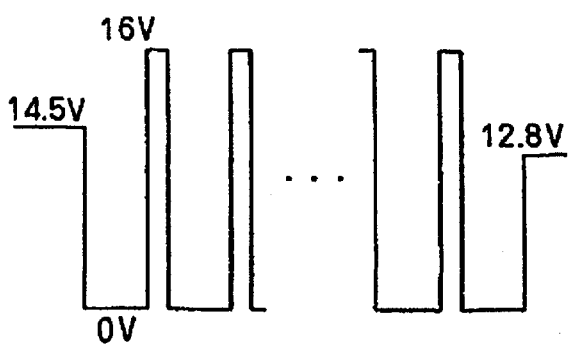

Vin

SET DUTY RATIO

C TERMINAL VOLTAGE

OUTPUT CURRENT

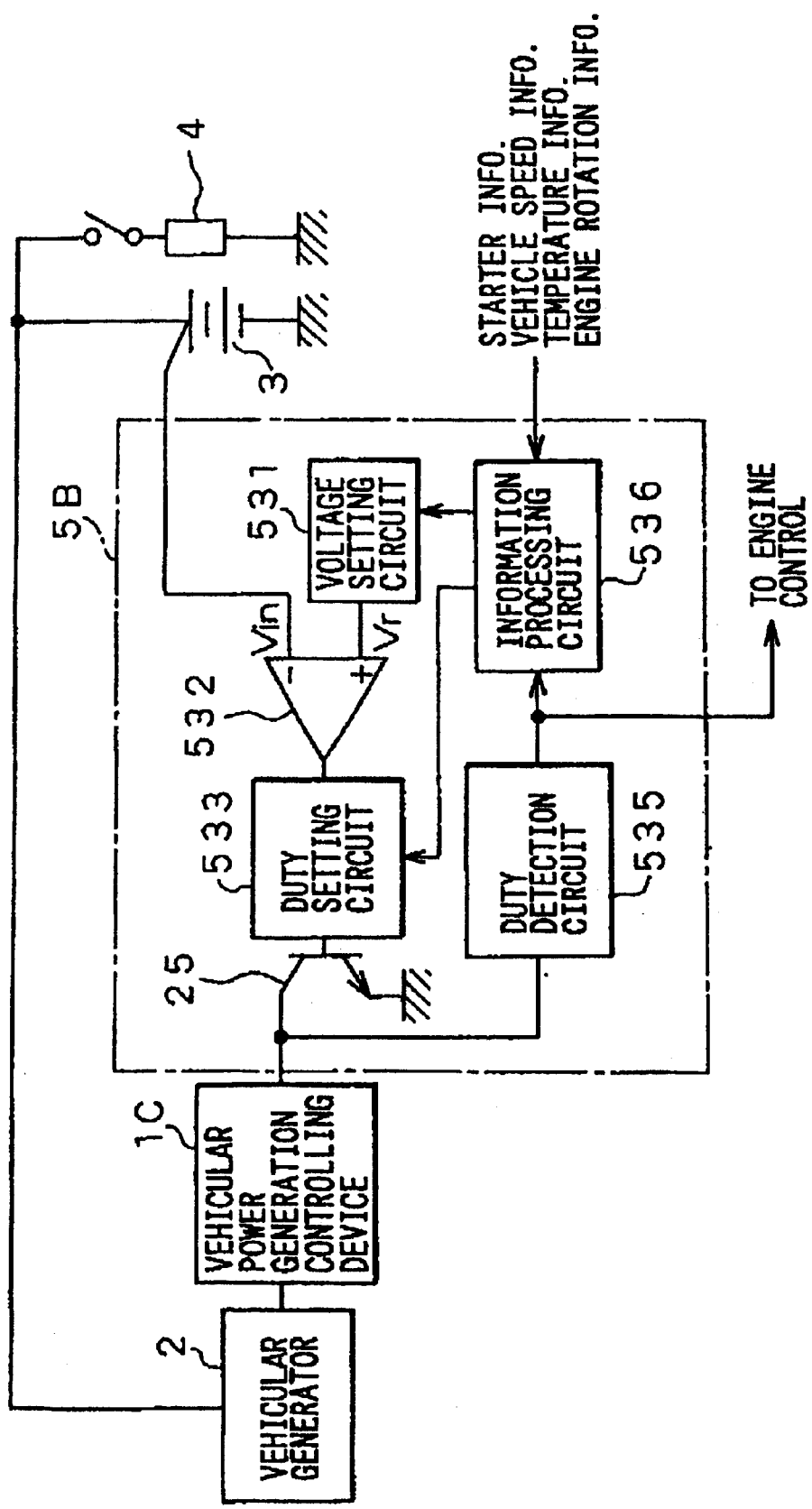

FIG. 16A OPERATION SWITCH (542)
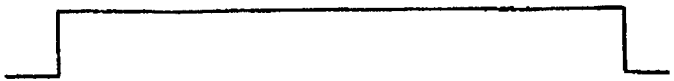
FIG. 16B LOAD SWITCH (541)
FIG. 16C C TERMINAL VOLTAGE
FIG. 16D BATTERY VOLTAGE
FIG. 16E POWER GENERATION CURRENT
FIG. 16F BATTERY (3)
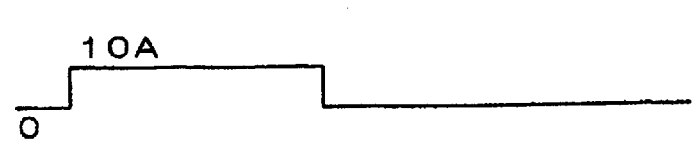
FIG. 16G LOAD CURRENT (540)
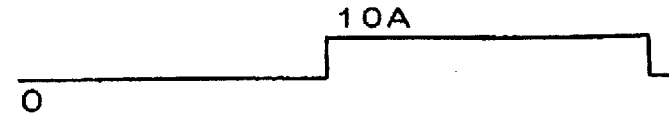

(a) (b)
FIG. 19A C TERNAL VOLTAGE
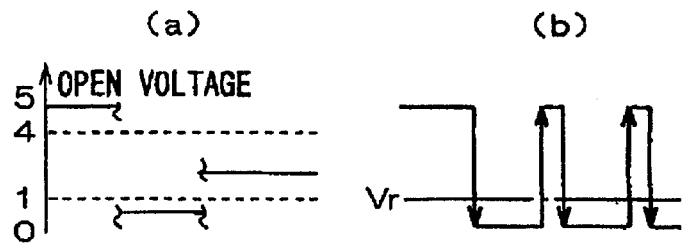
FIG. 19B OUTPUT OF VOLTAGE COMPARATOR (251)
FIG. 19C OUTPUT OF VOLTAGE COMPARATOR (252)
FIG. 19D OUTPUT OF NOR CIRCUIT (265)
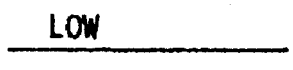
FIG. 19E ADJUSTMENT VOLTAGE
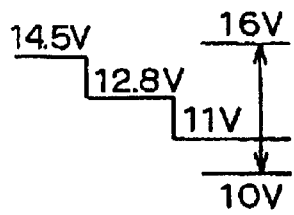
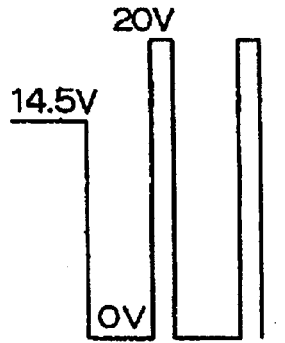

C TERMINAL VOLTAGE

OUTPUT OF CHANGE SIGNAL CIRCUIT (210)

OUTPUT OF SIGNAL PROCESS CIRCUIT (220)

ADJUSTMENT VOLTAGE

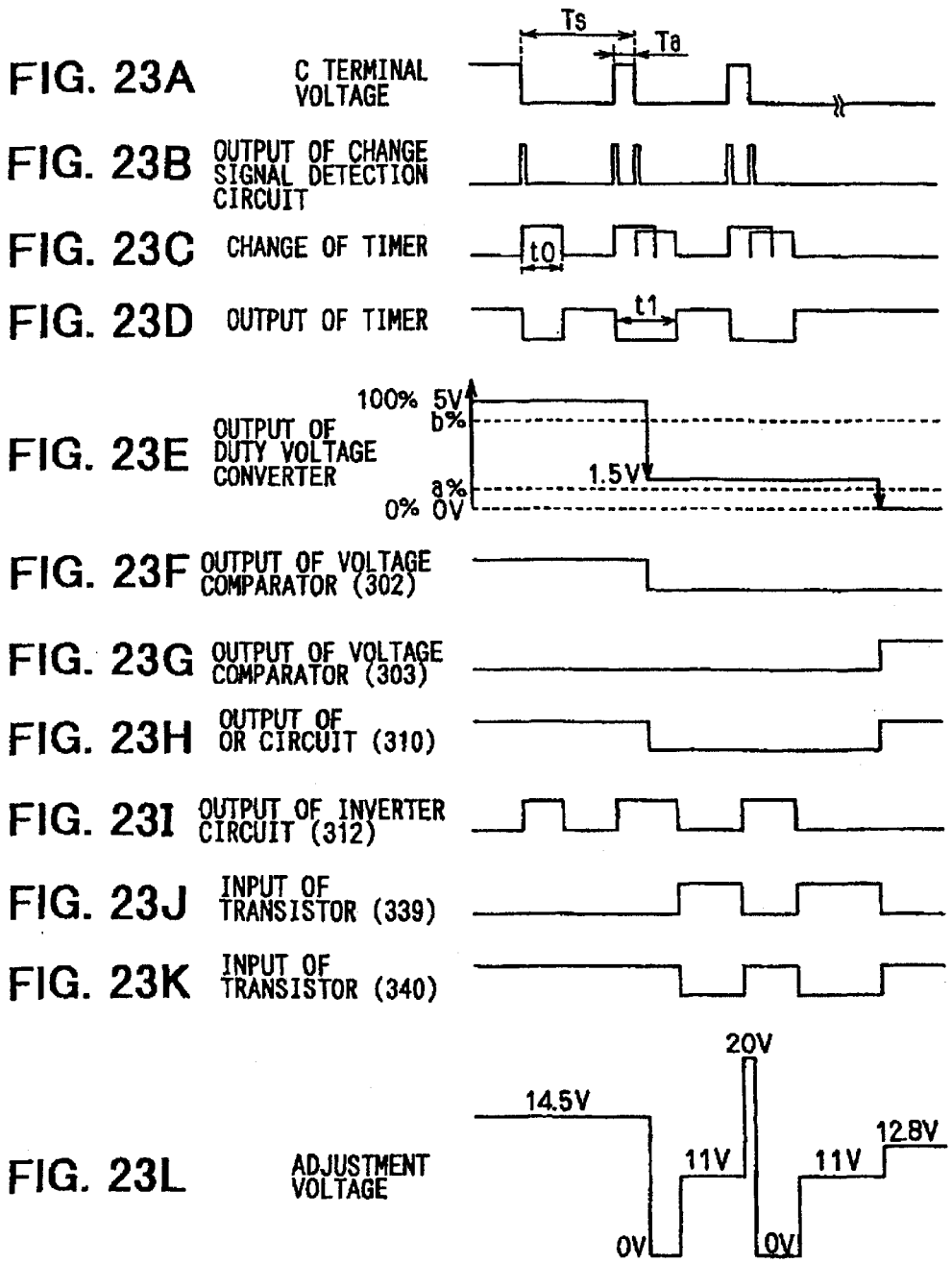

FIG. 24A  C TERMINAL VOLTAGE 
FIG. 24B  OUTPUT OF CHANGE SIGNAL DETECTION CIRCUIT 
FIG. 24C  CHANGE OF TIMER 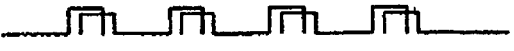
FIG. 24D  OUTPUT OF TIMER 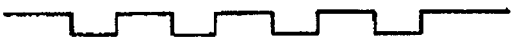
FIG. 24E  OUTPUT OF DUTY VOLTAGE CONVERTER 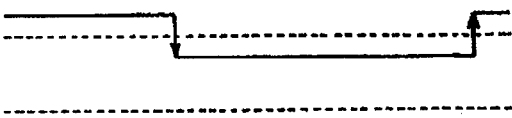
FIG. 24F  OUTPUT OF VOLTAGE COMPARATOR (302) 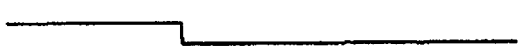
FIG. 24G  OUTPUT OF VOLTAGE COMPARATOR (303) 
FIG. 24H  OUTPUT OF OR CIRCUIT (310) 
FIG. 24I  OUTPUT OF INVERTER CIRCUIT (312) 
FIG. 24J  INPUT OF TRANSISTOR (339) 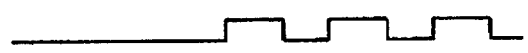
FIG. 24K  INPUT OF TRANSISTOR (340) 
FIG. 24L  ADJUSTMENT VOLTAGE 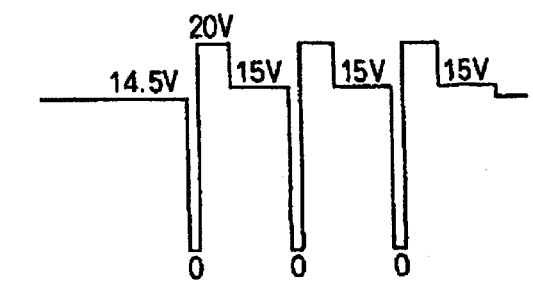

FIG. 25A  C TERMINAL VOLTAGE 
FIG. 25B  OUTPUT OF CHANGE SIGNAL DETECTION CIRCUIT 
FIG. 25C  CHANGE OF TIMER 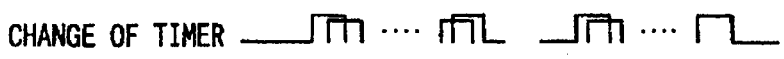
FIG. 25D  OUTPUT OF TIMER 
FIG. 25E  OUTPUT OF DUTY VOLTAGE CONVERTER 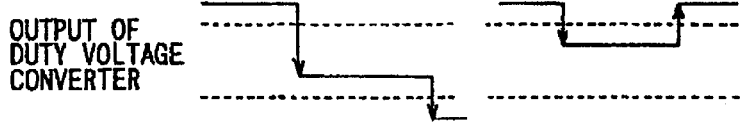
FIG. 25F  OUTPUT OF VOLTAGE COMPARATOR (302) 
FIG. 25G  OUTPUT OF VOLTAGE COMPARATOR (303) 
FIG. 25H  OUTPUT OF OR CIRCUIT (310) 
FIG. 25I  OUTPUT OF INVERTER CIRCUIT (312) 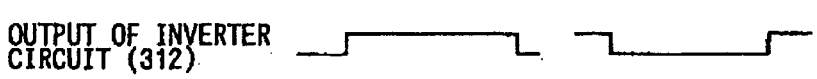
FIG. 25J  INPUT OF TRANSISTOR (339) 
FIG. 25K  INPUT OF TRANSISTOR (340) 
FIG. 25L  ADJUSTMENT VOLTAGE 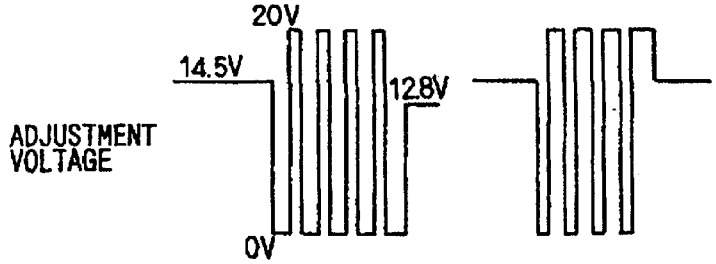

METHOD FOR CONTROLLING A VEHICULAR GENERATOR, AN EXTERNAL CONTROLLER AND A VEHICULAR POWER GENERATION CONTROLLING DEVICE

CROSS REFERENCE TO RELATED APPLICATION

This application is based on an incorporates herein by reference Japanese Patent Application No. 2000-343646 filed on Nov. 10, 2000.

BACKGROUND OF THE INVENTION

1. Field of the Invention

The present invention generally relates to a method for controlling a vehicular generator, an external controller and a vehicular power generation controlling device for controlling a power-generating state of a vehicular generator mounted on a vehicle, a truck or the like.

2. Description of Related Art

In general, a vehicular generator supplies power to a battery while the vehicle engine is running. Additionally, the generator provides power for engine ignition, lighting, and other various electrical components, while a generator controller is connected thereto in order to maintain a constant output voltage, even under varying load conditions. In recent years, driving torque of vehicular generators have increased as vehicular electrical loads have increased. If the driving torque of a vehicular generator grows excessively large while an engine is at idle speed, the engine speed becomes unstable. Therefore, a technique is known to avoid such a situation by controlling a power generation condition of the vehicular generator by a generator controller.

For example, in JP-A No. 7-194023, there is disclosed a generator controller that adjusts an output voltage of a vehicular generator to any value based on a duty ratio of a signal transmitted from an external control unit. When a duty signal corresponding to an adjusted voltage is transmitted through a communication line from the external controller unit, a converter within the generator controller converts the duty ratio of the signal to a voltage level so as to control an output voltage of the vehicular generator corresponding to the voltage level thereof.

Moreover, in JP-A No. 8-98430, there is disclosed a generator controller that suppresses power generation of a vehicular generator during a predetermined period when a state of an external control signal is switched.

In the above-described generator controller disclosed in JP-A NO. 7-194023, a duty ratio is converted to a voltage level so that an output voltage of a vehicular generator is controlled corresponding to the voltage level. However, a variable range of the output voltage by the duty ratio is limited, and therefore, if it is left as it is, electrical power cannot be supplied during a high voltage load. Moreover, because a duty voltage converter has undesirable conversion accuracy, there is a problem that it is not possible to conduct a new duty setting.

Moreover, in the above-described power generating controlling device disclosed in JP-A No. 8-98430, in a case where a signal line connected with an external control unit is shorted out, there is a problem related to the possibility of an overcharged battery because the adjusted voltage transitions to a high level.

Additionally, in the external controller, if electrical power generation is set to be switched externally by using a special-purpose signal line in addition to a conventional signal line for a battery charge control, it leads to an addition of a harness and an extensive change of the external controller. Therefore, a substantial increase in cost may result.

Furthermore, in the above-described generator controller disclosed in JP-A No. 7-194023, in order to mutually convert between a duty ratio and a voltage level, a plurality of converters are necessary. Therefore, the problem of a particularly complicated circuit structure exists.

SUMMARY OF THE INVENTION

The present invention is created in view of these aspects, and its object is to provide compatibility with a conventional one, and transfer new information. Moreover, another object of the present invention is that by employing a signal condition that is conventionally unused, without changing the hardware of an external controller, a control value is set corresponding to a vehicle condition by updating software. Furthermore, another object of the present invention is to provide a simple structure without using such a complicated conversion circuit for sending a command value.

In order to solve the above-described problem, a controlling method of a vehicular generator of the present invention, in a case where a power generation state of the vehicular generator is controlled by transmitting a setting signal to a vehicular power generation controller from an external controller, on the external controller side, a command of a first controlling value is allocated to a steady state of the setting signal. Additionally, a command of a second controlling value is allocated to a change state of the setting signal, and on a vehicular power generation controlling device side, during a predetermined period after detecting the change state of the setting signal, the second controlling value being different from the first controlling value corresponding to the steady state is set as an output controlling value of the vehicular generator.

The external controller of the present invention controls a power generation state of a vehicular generator by transmitting a steady state of a setting signal expressing a command of a first controlling value and a change state of the setting signal expressing a command of a second controlling value for changing the first controlling value for a predetermined time.

A vehicular power generation controlling device of the present invention includes an external signal identifying means for identifying a steady state and a change state of a setting signal transmitted from an external controller, and a controlling value setting means for setting a second setting value different from a first controlling value corresponding to the steady state during a predetermined time after a change state of the setting signal is detected by the external signal identifying means.

A vehicular power generation controlling device of the present invention includes an external signal identifying circuit for identifying a steady state and a change state of a setting signal transmitted from an external controlled, and an adjustment voltage controlling circuit for setting a second controlling value as an adjustment voltage of a vehicular generator, the second controlling value being different from a first controlling value corresponding to the steady state, during a predetermined time after a change state of the setting signal is detected by the external signal identifying circuit, and controls a power generation state of the vehicular controller by using the first controlling value and the second controlling value set by the adjustment voltage controlling circuit.

When a state of the setting signal is change, the first controlling value used so far is change to a second controlling value. Because a change of a control value can be performed without using a converter of an undesirable conversion accuracy, it becomes possible to transfer new information, that has been impossible when using the converter. Moreover, on an information transmitting side, a timing of a state change of the setting signal is only controlled, and thus, hardware does not have to be changed, and it can be dealt with by simply updating software, thereby suppressing a significant increase of the cost. Moreover, the setting signal itself is the same as what is used in the conventional vehicular power generation controlling device, thus enabling to give compatibility with the conventional device.

The power generation state of the vehicular generator is controlled by using the first controlling value and the second controlling value, both being set by the adjustment voltage controlling circuit, and when a state of the setting signal changes, the adjustment voltage is change by using a second controlling value which is different from a first controlling value used up until then, and thus, it is, possible to shorten a response time for changing the adjustment voltage. Moreover, it is unnecessary to include a converter for converting a duty ratio to a voltage, and thus, it is possible to simplify the circuit structure. Therefore, deterioration of adjustment accuracy due to the conversion does not occur.

Moreover, the above-described external signal identifying circuit preferably includes a voltage comparing means for detecting the setting signal input to a terminal for receiving an external signal by comparing a predetermined reference value and a voltage level of the terminal, and a changing state detection means for detecting a change state of the setting signal detected by the voltage comparing means. By comparing the voltage level of the receiving terminal with the reference value, it becomes possible to easily detect whether or not there is a setting signal. By examining a change state of the detected setting signal, a steady state and a change state can be identified easily.

Moreover, the above-described adjustment voltage controlling circuit desirably has a timer means for starting measuring a set period when the change state is detected by the external signal identifying circuit, and sets the second controlling value as the adjustment voltage until a measuring operation by the timer means is finished. By using the timer means, it is possible to arbitrary set a time for using the second controlling value as the adjustment voltage.

The first controlling value preferably corresponds to a power generation state under a steady state of the vehicular generator. Under the steady state where a change state is not detected, the adjustment voltage is set based on the first controlling value corresponding to the power generation state under the steady state, and therefore, it is possible to prevent a battery from excessively being charged due to the adjustment voltage becoming too high when a signal line transmitting and receiving the setting signal is opened or shorted out.

The second controlling value preferably corresponds to a power generation suspension state of the vehicular generator. Or the second controlling value corresponds to a forced power generation state of the vehicular generator. By bringing to a sate of power generation to suspension or full power generation, the power generation state of the vehicular generator can be controlled easily.

The above-described setting signal has a plurality of the steady state of different voltage levels, and the adjustment voltage controlling circuit preferably sets a plurality of the first controlling value corresponding to each of the plurality of the steady state. Because a plurality of the first controlling values can be selectively set, it becomes possible to control the power generation corresponding to a sate and the like of the vehicle.

The above-described external signal identifying circuit preferably distinguishes, when identifying the change state, a first change state corresponding to rising of the setting signal and a second change state corresponding to a falling thereof, and the adjustment voltage controlling circuit sets the second controlling value corresponding to the first change state different to a different value from the second controlling value corresponding to the second change state. Because it is possible to set a different adjustment voltage by using rising and falling of the signal, it is possible to control power generation corresponding to a state and the like of the vehicle.

In particular, it is desirable that one of the second controlling value corresponding to the first change state and the second controlling value corresponding to the second change state corresponds to a power generation suspension state of the vehicular generator while the other corresponds to a force power generation state of the vehicular generator. By repeating a forced power generation state and a power generation suspension state, it becomes possible to externally control the power generation state by the duty ratio. Thereby, it is possible to control the adjustment voltage over a wide range by the external controller.

Moreover, it is desirable that the above-described setting signal has a predetermined duty ratio, one of the second controlling value corresponding to the first change state and the second controlling value corresponding to the second change state corresponds to a power generation suspension state of the vehicular generator while the other corresponds to a force power generation state of the vehicular generator, and the first controlling value corresponding to the steady state is set to a value corresponding to the duty ratio. When using the setting signal having the duty ratio, it is possible to set the adjustment voltage corresponding to the forced power generation state or the power generation suspension state separately from a control of the adjustment voltage corresponding to the duty ratio, thus enabling to control the adjustment voltage over a wide range by the external controller.

Furthermore, it is desirable that the above-described adjustment voltage controlling circuit sets, when in the steady state where the change state is not detected by the external signal identifying circuit, the first controlling value as an adjustment voltage, the first controlling value having a voltage value being continuously changeable by corresponding to a voltage level of the setting signal. It is possible to change the adjustment voltage continuously corresponding to the voltage level of the setting signal. Moreover, by changing a state of the setting signal, it becomes possible to set an adjustment voltage using a second controlling value which is totally different, thus, enabling to use the adjustment voltage depending on a state or the like of the vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention, together with additional objectives, features and advantages thereof, will be best understood from the following description, the appended claims and the accompanying drawings in which:

FIGS. 2A–2F are timing diagrams showing signal waves input to and output from each part of the vehicular power generation controlling system according to the first embodiment;

FIG. 6 is a diagram showing a structure of a vehicular power generation controlling system according to a third embodiment;

FIGS. 7A–7H are diagrams showing signal waves input to and output from each part of the vehicular power generation controlling system according to the third embodiment;

FIGS. 8A–8G are diagrams showing signal waves input to and output from each part of the vehicular power generation controlling system according to a fourth embodiment;

FIGS. 10A–10H are diagrams showing signal waves input to and output from each part of the vehicular power generation controlling system according to the fifth embodiment;

FIG. 14 is a diagram showing a structure of a power generation controlling system according to a seventh embodiment;

FIGS. 16A–16G are timing diagrams showing a signal wave form of each part included in the power generation controlling system of the eighth embodiment;

FIGS. 19A(a)–19E(b) are diagrams showing a signal wave form input to and output from each part of the vehicular power generation controlling device according to the ninth embodiment;

FIGS. 23A–23L are diagrams showing a signal wave form input to and output from each part of the vehicular power generation controlling device according to the tenth embodiment;

FIGS. 24A–24L are diagrams showing a signal wave form input to and output from each part of the vehicular power generation controlling device according to the tenth embodiment; and FIGS. 25A(a)–25L(b) are timing diagrams showing another operation procedure of the vehicular power generation controlling device according to the tenth embodiment.

DETAILED DESCRIPTION OF THE INVENTION

Embodiments of a vehicular AC generator which apply to the present invention will be described in detail with reference to the drawings.

(First Embodiment)

Figure 1:
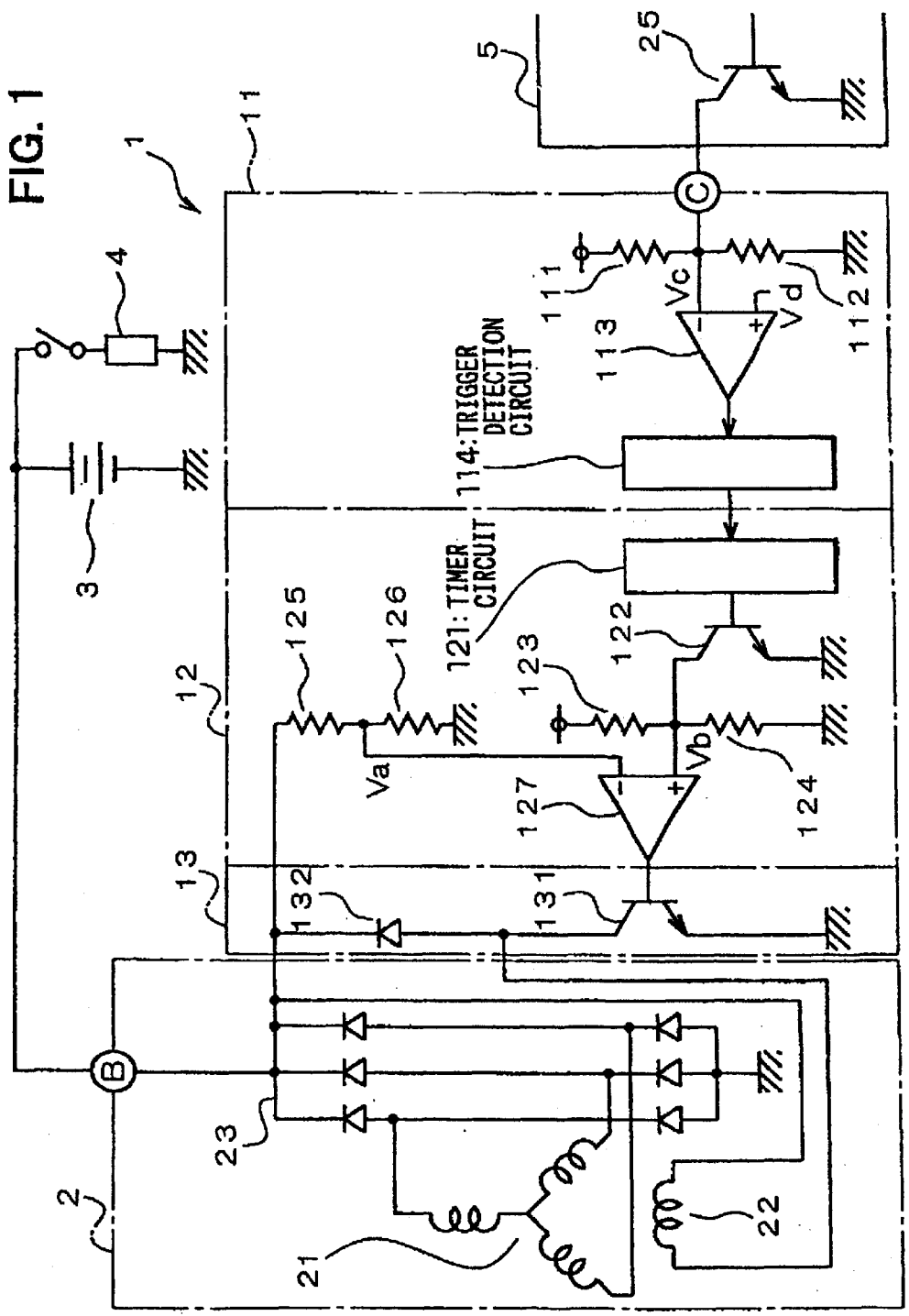
FIG. 1 is a diagram showing a structure of a vehicular power generation controlling system according to a first embodiment.

With regard to a first embodiment, FIG. 1 shows a diagram of a structure of a vehicular power generation controlling device to which the present invention is applied. Also shown is a connecting condition of the vehicular power generation controlling device with a vehicular generator, a battery, and the like.

In FIG. 1, a vehicular power generation controlling device 1 controls an output voltage of a vehicular generator 2 to a predetermined adjustment voltage set value (14.5 v, for example). A control terminal (C terminal) is connected to an external controller 5.

The vehicular generator 2 comprises a three-phase stator winding 21 included in a stator, a rectification circuit 23 provided for full-wave rectifying a three-phase output of the stator winding 21, and a magnetic field winding 22 included in a rotor. A control of the output voltage of the vehicular generator 2 is conducted by an appropriate on/off control of current passing toward the magnetic field winding 22 by the vehicular power generation controlling device 1. An output terminal (B terminal) of the vehicular generator 2 is connected to a battery 3 and other electrical loads 4, and electric current is supplied to them from the vehicular generator 2.

The external controller 5 is connected to the C terminal of the vehicular power generation controlling device 1, and controls operation of the vehicular power generation controlling device 1 according to a vehicular condition. Accordingly, the external controller 5 controls a built-in transistor 25 so as to input to the C terminal the adjustment voltage setting signal which switches between a high level condition and a low level condition at a predetermined timing.

Next, a detailed structure and operation of the vehicular power generation controlling device 1 will be described.

As shown in FIG. 1, the vehicular power generation controlling device 1 comprises an external signal identifying circuit 11, an adjustment voltage controlling circuit 12, and an excitation current controlling circuit 13.

As an external signal identifying means, the external signal identifying circuit 11 has resistors 111 and 112, a voltage comparator 113 and a trigger detection circuit 114, and identifies contents of the adjustment voltage setting signal transmitted from the external controller 5. A signal line extending from the external controller 5 is terminated by the resistors 111 and 112 through the C terminal. The voltage comparator 113 and the trigger detection circuit 114 correspond to a voltage comparison means and an alternating condition detection means, respectively.

The voltage comparator 113 has a minus terminal connected to the C terminal and a plus terminal applied by a reference voltage Vd, and compares voltages of those two terminals. The reference voltage Vd is set to be higher than a voltage $V_{CL}$ of the C terminal when a signal of the low level is input from the external controller 5, and lower than a voltage $V_{CH}$ of the C terminal when a signal of the high level is input. The trigger detection circuit 114 outputs a predetermined pulse when an output condition of the voltage comparator 113 changes.

The adjustment voltage controlling circuit 12 as a controlling value setting means has a timer circuit 121, a transistor 122, four resistors 123 to 126, and a voltage comparator 127, and sets an adjustment voltage based on an identified result of the external signal identifying circuit 11. The timer circuit 121 is activated when a predetermined pulse signal is input from the trigger detection circuit 114 within the external signal identifying circuit 11, and maintains an output at its high level during a predetermined period of time. The timer circuit 121 corresponds to a timer means. The transistor 122 has an output signal of the timer circuit 122 input to a base thereof and an emitter grounded thereon, and is connected to a plus terminal of the voltage comparator 127 and a voltage divider circuit whose connector is composed of resistors 123 and 124. To the plus terminal of the voltage comparator 127, a divided voltage determined by each resistance of the resistors 123 and 124 is applied as the reference voltage Vb of the adjustment voltage when the transistor 122 is turned OFF, and when the transistor 122 is turned ON, substantially 0V (precisely speaking, a forward voltage between the connector and the emitter) is applied as the reference voltage Vb of the adjustment voltage. To a minus terminal of the voltage comparator 127, a voltage Va, which is an output voltage of the vehicular generator 2, is divided by the voltage divider composed of the resistors 125 and 126. The voltage comparator 127 compares between the reference voltage Vb of the adjustment voltage applied to the plus terminal, and the voltage Va coupled with the output of the vehicular generator 2 applied to the minus terminal, and sets the output at a high level in a case when the voltage Va is lower than the reference voltage Vb of the adjustment voltage.

The excitation current controlling circuit 13 has a transistor 131 and a fly wheel diode 132, and controls excitation current which is fed to the magnetic field winding 22. The transistor 131 has an output terminal of the voltage comparator 127 within the adjustment voltage controlling circuit 12 connected to its base, and becomes its on-state when an output of the voltage comparator 127 is at its high level. At that time, the excitation current fed to the magnetic field winding 22 in the vehicular generator 2 is increased. The fly wheel diode 132 is connected in parallel to the magnetic field winding 22, and is provided in order to feed circulation current which is generated when the current passing to the magnetic field winding 22 is on-off controlled.

The vehicular power generation controlling device 1 of the present invention has such structure, and its operation will now be described.

FIG. 2 is a timing diagram showing a signal wave input and output to each part of the vehicular power generation controlling device 1 of the present invention.

The first scenario involves a case where the adjustment voltage setting signal is at a high level. When the transistor 25 in the external controller 5 is at its off state (FIG. 2A), a voltage of the C terminal becomes a voltage $V_{CH}$ which is biased by the resistors 111 and 112 (FIG. 2B). When the voltage $V_{CH}$ applied to the minus terminal of the voltage comparator 113 is compared to the voltage Vd applied to the plus terminal, Vd<$V_{CH}$, and thus, an output of the voltage comparator 113 maintains its low level state (FIG. 2C). At that time, an output of the trigger detection circuit 114 maintains its low level (FIG. 2D), and therefore, the timer circuit 121 does not activate, and an output of the timer circuit 121 maintains its low level (FIG. 2E). Accordingly, the transistor 122 connected to an output side of the timer circuit 121 maintains its off-state, and the reference voltage Vb of the adjustment voltage applied to the plus terminal of the voltage comparator 127 is set to a predetermined value (a value corresponding to 14.5V, for example) determined by a resistance ratio of the resistors 123 and 124 (FIG. 2F). Thereby, a control operation of the vehicular power generation controlling device 1 is conducted so that an output voltage of the vehicular generator 2 becomes 14.5 volts (V).

A second scenario involves a case where the adjustment voltage setting signal is changed from its high level to low level. When the transistor 25 in the external controller 5 is changed from its off-state to on-state (FIG. 2A), a voltage of the C terminal becomes a voltage $V_{CL}$ which connects points of the resistors 111 and 112 and short-circuits to a ground side by the on-state transistor 25 (FIG. 2B). When the voltage $V_{CL}$ applied to the minus terminal of the voltage comparator 113 is compared to the voltage Vd applied to the plus terminal, Vd>$V_{CL}$, and thus, the output of the voltage comparator 113 changes from its low level to high level (FIG. 2C). The trigger detection circuit 114 detects its changing condition and outputs a predetermined pulse (FIG. 2D). The timer circuit 121 is activated by the pulse, and an output of the timer circuit 121 becomes high level during a predetermined period (FIG. 2E). Accordingly, the transistor 122 connected to an output side of the timer circuit 121 changes from its off-state to on-state, and the reference voltage Vb of the adjustment voltage applied to the plus terminal of the voltage comparator 127 is set generally to 0V (FIG. 2F). A time for setting the reference voltage Vb of the adjustment voltage at generally 0V is a time which an output of the timer circuit 121 is maintained at its high level, and by turning the transistor 25 in the external controller 5 to on-state once, the time continues for a predetermined period of time. When the predetermined period of time passes, the output of the timer circuit 121 returns from the high level to the low level (FIG. 2E), and thus, the reference voltage Vb of the adjustment voltage is returned to its original voltage, and a control operation by the vehicular power generation controlling device 1 is conducted so that the output voltage of the vehicular generator 2 becomes 14.5V (FIG. 2F).

As such, by changing the adjustment voltage setting signal transmitted to the vehicular power generation controlling device 1 from the low level to the high level, the external controller 5 can suspend a power generating condition of the vehicular generator 2 temporarily, thus enabling a reduction in power generating torque under acceleration and the like, and resulting in an increase in vehicle acceleration.

Moreover, the external controller 5 can change the power generating condition of the vehicular generator 2 for a predetermined time by one operation, it is unnecessary to transmit the adjustment voltage setting signal all the time, thus enabling minimization of a transmitting information amount required for the adjustment voltage setting.

Moreover, even when the C terminal is in an open-state or short-circuited with the ground or a power source line due to an abnormality in a signal line, or the like, connecting the C terminal of the vehicular power generation controlling device 1 with the external controller 5, only results in that changing of the power generating condition of the vehicular generator 2 becomes impossible. The vehicular power generation controlling device 1 can control a normal condition where the output voltage is 14.5V, thus preventing excessive charging of the battery 3.

Moreover, when a state of the adjustment voltage setting signal changes, an adjustment voltage value changes to a different value from what it was, and thus, it is possible to transfer new information which changes a controlling value (adjustment voltage) without using a converter, which has undesirable conversion accuracy, and which was impossible when using the converter. At a transmitting side of the adjustment voltage setting signal, timing of a state change of the setting signal is controlled, and thus, it is not necessary to change the hardware, so it is possible to deal with it by simply updating the software, thus enabling a substantial reduction in the cost.

It should be noted that in the present embodiment described above, when a sate of the adjustment voltage setting signal input from the external controller 5 is changed, the adjustment voltage is controlled to be generally 0V during a predetermined time period. Alternatively, the adjustment voltage can be controlled to be higher than 14.5V (16V, for example), which is the adjustment voltage of a normal state, during a predetermined time. Thereby, a forced power generating state is implemented only during a predetermined time to increase the power generating torque so that a brake is brought into an assisting operation when decelerating a vehicle.

Figure 3:
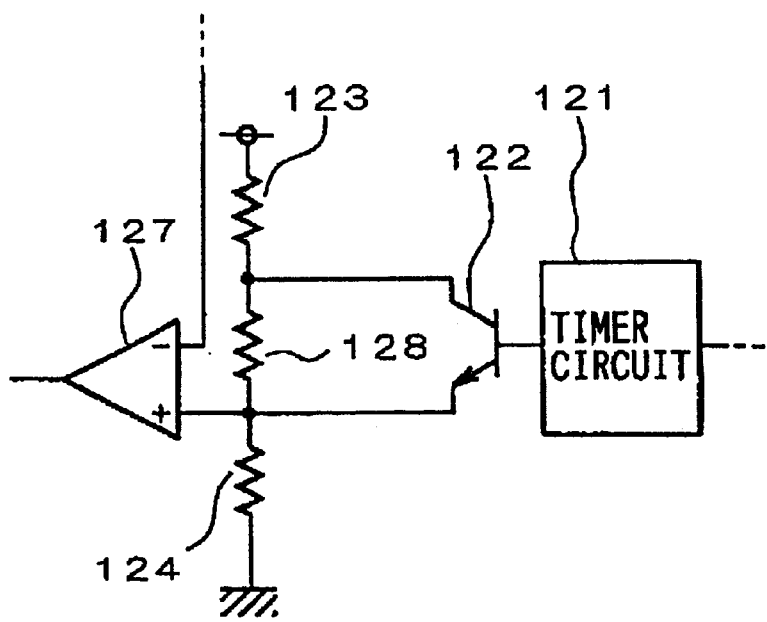
FIG. 3 is a circuit diagram showing a partial structure of a vehicular power generation controlling system which is set to raise an adjustment voltage temporarily.

FIG. 3 is a circuit diagram showing a partial structure of a vehicular power generation controlling device whose adjustment voltage is set to be elevated temporarily, and showing a structure of a part that is to be inserted between the timer circuit 121 and the voltage comparator 127. When a state of the adjustment voltage setting signal is changed, the transistor 122 connected to the output side of the timer circuit 121 is placed into an on-state during a predetermined time period, and thus, the resistor 128 included in a series circuit composed of the resistors 123, 128, and 124 is short-circuited by the transistor 122. Therefore, a voltage at a connecting point of the resistor 128 and the resistor 124 is increased, so that the output voltage of the vehicular generator 2 is controlled by the adjustment voltage that is higher than it was.

[Second Embodiment]

Figure 4:
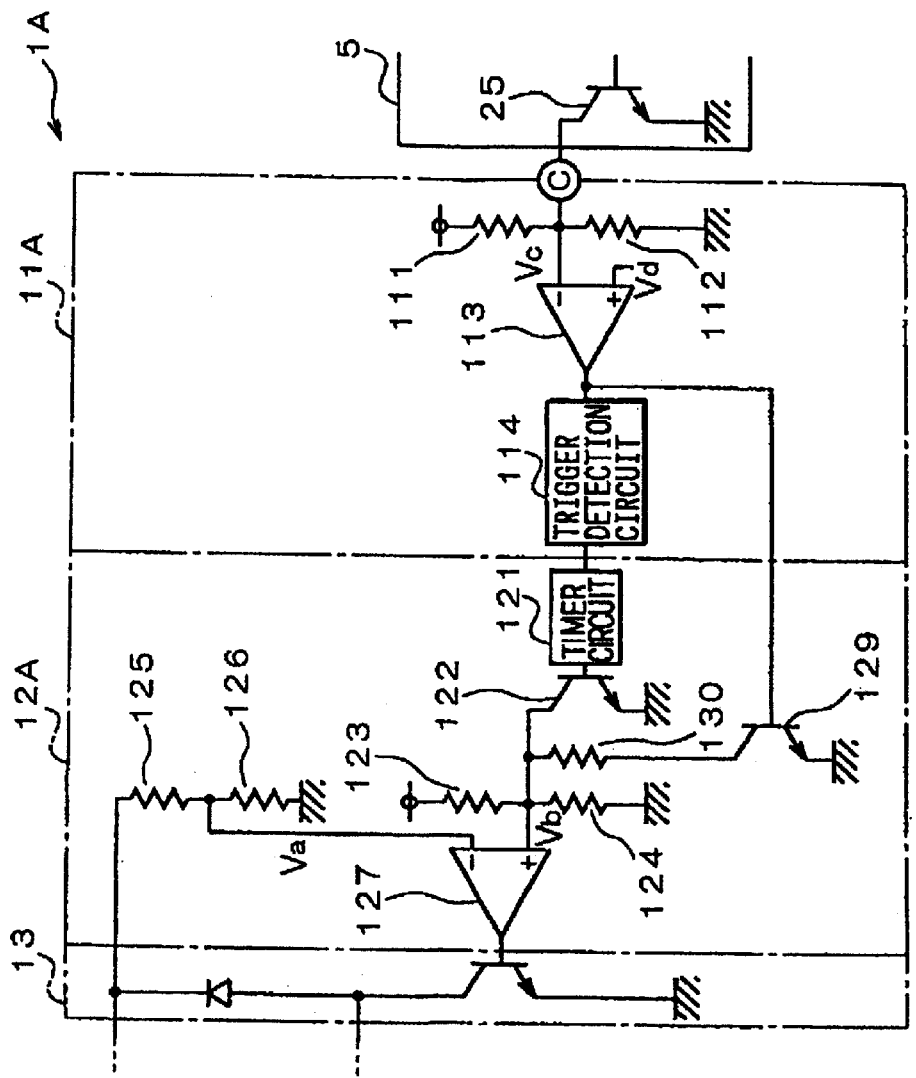
FIG. 4 is a diagram showing a structure of a vehicular power generation controlling system according to a second embodiment.

With regard to a second embodiment, FIG. 4 shows a diagram of a structure of a vehicular power generation controlling device to which the present invention is applied. A vehicular power generation controlling device 1A as shown in FIG. 4, in comparison to the vehicular power generation controlling device 1 as shown in FIG. 1, has an external signal identifying circuit 11A and an adjustment voltage controlling circuit 12A in place of the external signal identifying circuit 11 and the adjustment voltage controlling circuit 12, respectively. The external voltage adjustment circuit 12A has a structure to which a transistor 129 and a resistor 130 are added as opposed to the external voltage adjustment circuit 12. The external signal identifying circuit 11A has a structure which is basically the same as the external signal identifying circuit 11, but is different in a point that an output terminal of the voltage comparator 11 is connected to a base of the transistor 129 in the external voltage adjustment circuit 12A other than the trigger detection circuit 114.

In the external voltage adjustment circuit 12A, a connecting point of the resistors 123 and 124 is grounded between a collector and an emitter of the transistor 129 and the resistor 130. Thus, when an output of the voltage comparator 113 in the external signal identifying circuit 11A becomes a high level so as to turn the transistor 129 to its on-state, the resistor 130 enters a state where it is connected parallel to the resistor 124, and thus, it becomes possible to change the reference voltage Vb of the adjustment voltage applied to a plus terminal of the voltage comparator 127 to a low voltage side.

FIGS. 5A–5H show a diagram of a signal wave which is input and output to each part of the vehicular power generation controlling device 1A according to the present embodiment.

The following describes a case where the adjustment voltage setting signal is at a high level. When the transistor 25 in the external controller 5 is in its off-state, each part is operated similarly to the above-described first embodiment. At that time, two transistors, 122 and 129, are in the off-state (FIGS. 5F and 5G), and thus, current is not fed through the resistor 130 which is newly added in the present embodiment, so the reference voltage Vb of the adjustment voltage applied to the plus terminal of the voltage comparator becomes a predetermined value corresponding to the normal state. Therefore, an output voltage of the vehicular generator 2 is controlled at 14.5V.

Figure 5A:
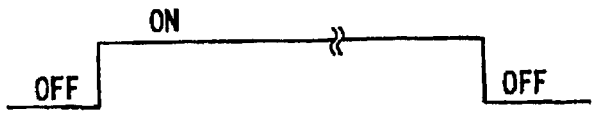
FIGS. 5A–5H are diagrams showing signal waves input to and output from each part of the vehicular power generation controlling system according to the second embodiment.
Figure 5B:
Figure 5C:
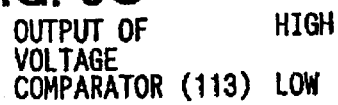
Figure 5D:
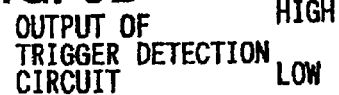
Figure 5E:
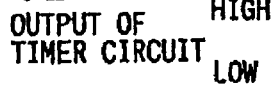

The following describes a case where the adjustment voltage setting signal changes from a high level to a low level. When the transistor 25 in the external controller 5 changes from the off-state to the on-state (FIG. 5A), a voltage of the C terminal becomes a voltage, $V_{CL}$, which is lower than a voltage Vd (FIG. 5B), so that the output of the voltage comparator 113 changes from the low level to the high level (FIG. 5C). The trigger detection circuit 114 detects such change in the state, and outputs a predetermined pulse (FIG. 5D). The timer circuit 121 is activated by the pulse, and its output becomes the high level during the predetermined time (FIG. 5E), so that the transistor 122 is switched to the on-state (FIG. 5F).

Figure 5F:
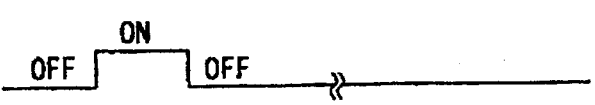
Figure 5G:
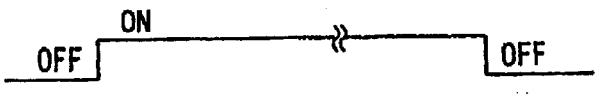

On the contrary, when the output of the voltage comparator 113 turns to the high level, the transistor 129 is switched to the on-state (FIG. 5G). Therefore, two transistors, 122 and 129, are both turned ON, and thus, the reference voltage Vb of the adjustment voltage applied to the plus terminal of the voltage comparator 127 is set to generally 0V (FIG. 5H).

When a predetermined time period set by the timer circuit 121 passes, the output of the timer circuit 121 returns to the low level (FIG. 5E), and one of the transistors 122 is switched to the off-state (FIG. 5F). However, while the adjustment voltage setting signal maintains its high level state, the output of the voltage comparator 113 also maintains its high level state (FIG. 5C), and therefore, the other transistor 129 maintains the on-state (FIG. 5G). Accordingly, the resistor 124 and the resistor 130 are in a state where they are connected in parallel, and a voltage applied to the plus terminal of the voltage comparator 127 is changed to the low voltage side, so that the adjustment voltage of the vehicular generator 2 is set to be a lower value than the normal state (for example, 12.8V)(FIG. 5H).

Figure 5H:
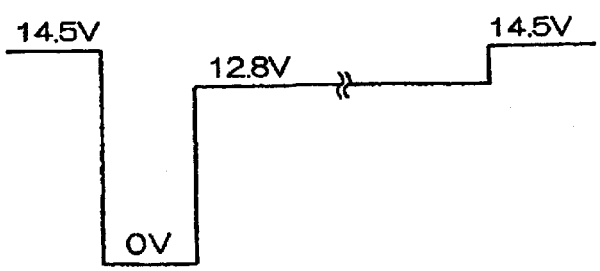

Thereafter, the transistor 25 in the external controller 5 is turned to the off-state (FIG. 5A), so that when the adjustment voltage setting signal gets to the high level, the transistor 129 changes to its off-state (FIG. 5G), and thus, the adjustment voltage is set to be back to 14.5V (FIG. 5H). As such, by changing the adjustment voltage setting signal transmitted to the vehicular power generation controlling device 1 from the low level to the high level, the external controller 5 temporarily suspends a power generating condition of the vehicular generator 2, thus enabling a reduction of torque contributing to power generation and the like, and an overall increase in acceleration of a vehicle.

Moreover, by maintaining the adjustment voltage setting signal at its low level by turning the transistor 25 to its on-state, the external controller 5 can set the adjustment voltage to 12.8V which is lower than the normal state, thus enabling the torque applied to power generation to be lower than its normal state, so that it becomes possible to improve the fuel efficiency of the vehicle. In particular, by enabling a setting of a third adjustment voltage (generally 0V), which is set when an improvement of the acceleration of the vehicle is desired, in addition to a conventional operation of controlling the vehicular generator 2 by two types of adjustment voltages 14.5V and 12.8V, it is possible to implement fine control under acceleration and compatibility with conventional fuel efficiency control or the like.

[Third Embodiment]

With regard to a third embodiment, FIG. 6 shows a diagram of a structure of a vehicular power generation controlling device to which the present invention is applied. A vehicular power generation controlling device 1B, as shown in FIG. 6, in comparison to the vehicular power generation controlling device 1A, as shown in FIG. 4, has an external signal identifying circuit 11B and an adjustment voltage controlling circuit 12B in place of the external signal identifying circuit 11A and the adjustment voltage controlling circuit 12A, respectively.

The external signal identifying circuit 11B comprises resistors 111 and 112, a voltage comparator 113, a rising trigger detection circuit 114A and a falling trigger detection circuit 114B. The external signal identifying circuit 11B, in comparison to the external signal identifying circuit 11A as shown in FIG. 4, has a structure in which the rising trigger detection circuit 114A and the falling trigger detection circuit 114B replace the trigger detection circuit 114. The rising trigger detection circuit 114A outputs a predetermined pulse when it detects a rising state of a signal in which an output of the voltage comparator 113 changes from the low level to the high level. On the contrary, the falling trigger detection circuit 114B outputs a predetermined pulse when it detects a falling state of a signal in which an output of the voltage comparator 113 changes from the high level to the low level.

The adjustment voltage controlling circuit 12B is composed of time circuits 121A and 121B, transistors 122 and 133, six resistors 123 to 126, 130 and 134, and a voltage comparator 127. The adjustment voltage controlling circuit 12B, when compared to the adjustment voltage controlling circuit 12A as shown in FIG. 4, is different in points where the timer circuits 121A and 121B replace the timer circuit 121, and the transistor 133 and the resistor 134 is added downstream of the timer circuit 121B.

One of the timer circuits 121A is activated when a predetermined pulse signal is output from the rising trigger detection circuit 114A in the external signal identifying circuit 11B, and maintains the output at the high level during a predetermined time period. The timer circuit 121A is reset when a predetermined pulse signal is output from the falling trigger detection circuit 114B in the external signal identifying circuit 11B, and if the output is still at a high level at that time, it is forced to be returned to the low level.

Another timer circuit 121B is activated when a predetermined pulse signal is output from the falling trigger detection circuit 114B, and maintains the output at the high level during a predetermined time period. An output terminal of the timer circuit 121B is connected to a base of the transistor 133. A connecting point of the resistors 125 and 126 is grounded between a collector and an emitter of the transistor 133 and the resistor 134. Accordingly, when the transistor 133 is switched to the on-state activation of the timer circuit 121B due to a pulse output from the falling trigger detection circuit 114B at a time the output of the voltage comparator 113 in the external signal identifying circuit 11B changes from the high level to the low level, the resistor 126 becomes connected to the resistor 134 in parallel, and thus, the voltage Va applied to the minus terminal of the voltage comparator 127 can be changed to the low voltage side. Therefore, an output voltage of the vehicular generator 2 required for generating the voltage Va which matches the reference voltage Vb of the adjustment voltage can be changed to the high voltage side (for example, 16V).

FIGS. 7A–7H are diagrams showing a signal wave input to and output from each part of the vehicular power generation controlling device 1B of the present embodiment.

In a case where the adjustment voltage setting signal is at its high level, when the transistor 25 of the external controller 5 is in the off-state, each part operates similar to the above-described first embodiment and second embodiment. At that time, three transistors 122, 129 and 133 all reside in an off-state, and thus, electric current is not fed to the resistor 130 and 134, so that the reference voltage Vb of the adjustment voltage becomes a predetermined value corresponding to the normal state. Therefore, the output voltage of the vehicular generator 2 is controlled at 14.5V.

In a case where the adjustment voltage setting signal changes from the high level to the low level (part 1), when the transistor 25 in the external controller 5 is changed from its off-state to on-state (FIG. 7A), a voltage of the C terminal becomes a voltage $V_{CL}$ which is lower than the voltage Vd (FIG. 7B), and the output of the voltage comparator 113 changes from the low level to the high level (FIG. 7C). The rising trigger detection circuit 114A detects the rising of the output and outputs a predetermined pulse (FIG. 7D). One of the timer circuits 121A is activated by the pulse, and its output becomes high level during a predetermined time period Ta (FIG. 7E). Accordingly, the transistor 122 connected to an output side of the timer circuit 121A is turned ON, and the reference voltage Vb of the adjustment voltage applied to the plus terminal of the voltage comparator 127 is set to generally 0V (FIG. 7H). When the predetermined time period Ta set by the timer circuit 121A is passed, the output of the timer circuit 121A returns to the low level (FIG. 7E), and the transistors 122 is switched to the off-state. However, while the adjustment voltage setting signal maintains its high level state, the output of the voltage comparator 113 also maintains its high level state (FIG. 7C), and therefore, the transistor 129 maintains the on-state. Accordingly, the resistor 124 and the resistor 130 are in the state where they are connected in parallel, and a voltage applied to the plus terminal of the voltage comparator 127 is changed to the low voltage side, so that the adjustment voltage of the vehicular generator 2 is set to be a lower value than the normal state (12.8V)(FIG. 7H).

Thereafter, the transistor 25 in the external controller 5 is turned to be in the off-state (FIG. 7A), so that when the adjustment voltage setting signal gets to the high level, the transistor 129 turns to its off-state, and thus, the adjustment voltage is set to be back to 14.5V (FIG. 7H).

In a case where the adjustment voltage setting signal changes from the high level to the low level (part 2), a transistor 25 in the external controller 5 is controlled to be switched to the on-state for a short period of time. As described above, when the transistor 25 in the external controller 5 changes from the off-state to the on-state, the timer circuit 121A turns an output to the high level (FIG. 7E). The output signal of the timer circuit 121A has been input to the falling trigger detection circuit 114B, and the falling trigger detection circuit 114B detects a state in which an output of the voltage comparator 113 changes from the high level to the low level while the output of the timer circuit 121A is in the high level.

Before the predetermined time Ta is being passed when the timer circuit 121A is being activated, the adjustment voltage setting signals return from the low level to the high level, and when the output of the voltage comparator 113 falls, the falling trigger detection circuit 114B detects the falling state and outputs a predetermined pulse (FIG. 7F). By this pulse, one of the timer circuits 121A is reset (FIG. 7E), and the other timer circuit 121B is activated, so that its output becomes the high level during a predetermined time Tb (FIG. 7G).

Therefore, because only the transistor 133 provided on the output side of the timer circuit 121B is switched to the on-state and the other two transistors 122 and 129 are in an off-state, a voltage applied to the minus terminal of the voltage comparator 127 changes to the low voltage side so that the output voltage of the vehicular generator 2 is controlled at a voltage (16V) higher than the normal state.

Thereafter, when the predetermined time Tb is passed after activation of the timer circuit 121B, its output becomes the low level and the transistor 133 is turned to be in the off-state, and thus, the adjustment voltage is set to be back to 14.5V (FIG. 7H). As such, by changing the adjustment voltage setting signal transmitted to the vehicular power generation controlling device 1 from the high level to the low level by changing the transistor 25 from an off-state to an on-state, the external controller 5 can suspend a power generating condition of the vehicular generator 2 temporarily. This temporary suspension of torque normally contributed to power generation, during vehicle acceleration, permits increased acceleration of a vehicle.

Moreover, by maintaining the adjustment voltage setting signal at its low level by turning the transistor 25 to the on-state, the external controller 5 can set the adjustment voltage to 12.8V which is lower than the normal state, thus enabling the power generating torque to be reduced lower than its normal state, so that it becomes possible to improve the fuel efficiency of the vehicle.

In a case where a deceleration control of the vehicle is desired by temporarily increasing the power generating torque of the vehicle, the external controller 5 only has to change the transistor 25 to the on-state for a short time period. Thereby, a forced power generating state is implemented only during a predetermined time to increase the power generating torque so that a brake is brought into an assisting operation when decelerating a vehicle.

Moreover, in addition to a conventional operation of controlling the vehicular generator 2 by two types of adjustment voltages 14.5V and 12.8V, a third adjustment voltage (generally 0V), which is set when an improvement of the vehicle acceleration is desired, can be set as well as a fourth adjustment voltage (16V), which is set when deceleration of the vehicle is desired, and thus, it is possible to implement a fine control at a time of acceleration and deceleration and maintain compatibility with conventional fuel efficiency controls.

[Fourth Embodiment]

With regard to a fourth embodiment of the present invention, a vehicular power generation controlling device has the same structure as the vehicular power generation controlling device 1 of the first embodiment described above. Additionally, a power generation control system is provided for having the vehicular power generation controlling device 1 conduct a particular operation by contriving the content of the adjustment voltage setting signal transmitted from the external controller 5. Specifically, the power generating controlling system of the present invention controls the adjustment voltage to generally at 0V over a long period of time by switching the transistor 25 on and off in a predetermined repeating interval by the external controller 5.

FIGS. 8A–8G is a diagram showing a signal wave input to and output from each part in the power generating controlling system of the present embodiment. Hereinbelow, by using a structure of the vehicular power generation controlling device 1 as shown in FIG. 1, an operation of the power generation controlling system of the present embodiment, in which the external controller 5 and the vehicular power generation controlling device 1 combined, will be described. As described in the first embodiment, when the transistor 25 in the external controller 5 is switched from the off-state to the on-state, the C terminal voltage of the vehicular power generation controlling device 1 changes from the high level to the low level (FIGS. 8A and 8B). At that time, the output of the voltage comparator 113 changes from the low level to the high level (FIG. 8C), and a predetermined pulse is output from the trigger detection circuit 114 (FIG. 8D). The timer circuit 121 is activated by the pulse, and maintains its output at the high level for a predetermined time period Ta (FIG. 8E).

In the present embodiment, the external controller 5 switches the transistor 25 from the off-state to the on-state at an interval of t1. The interval t1 is set to be a shorter time than the time Ta during which the high level output is maintained since the pulse is input to the timer circuit 121. Therefore, while an output of the timer circuit 121 is maintained at the high level corresponding to a last pulse output from the trigger detection circuit 114, a next pulse is output from the trigger detection circuit 114 (FIG. 8D), and the timer circuit 121 is activated by the pulse so as to maintain again from that point for a period of the time Ta. As such, by outputting the pulse periodically by the trigger detection circuit 114 before the output of the timer circuit 121 returns to the low level, the output of the timer circuit 121 can be maintained continuously at the high level while the transistor 25 in the external controller 5 is on-off controlled at the interval t1 (FIG. 8F), thus enabling to control the adjustment voltage to generally 0V during that time (FIG. 8G).

Thereafter, once the on/off control by the transistor 25 in the external controller 5 is suspended, after the last pulse is output from the trigger detection circuit 114, the output of the timer circuit 121 is changed to the low level after the time Ta is passes (FIG. 8F), the adjustment voltage is set to the normal state of 14.5V again (FIG. 8G). As such, because the adjustment voltage can be changed to generally 0V from the external controller 5 during an arbitrary period, the power generating torque can be cut by suspending the power generating state of the vehicular generator 2, and thus, it becomes possible to improve engine starting performance and vehicle acceleration.

Moreover, by partially changing a structure of the vehicular power generation controlling device 1 to a structure shown in FIG. 3, it becomes possible to change the adjustment voltage to 16V from the external controller 5 during an arbitrary period, and by conducting a forced power generation, it becomes possible to provide braking assistance at a time of deceleration due to an increase of the power generating torque and a rapid charging of the battery 3. Moreover, when the signal line connecting the C terminal of the vehicular power generation controlling device 1 and the external controller 5 is short-circuited to a power source line, a ground or the like or becomes an open circuit, the adjustment voltage setting signal is fixed to the low level or the high level, and thus, it is possible to implement a fail-safe function that enables the autonomous control at 14.5V corresponding to the normal state.

Furthermore, by extending the time of the on/off control of the transistor 25 in the external controller 5, the adjustment voltage can be changed for a long time period. Therefore, even under such circumstances, the timer circuit 121, whose time Ta until the conclusion of a predetermined elapsed time is short, can be used. Accordingly, it is possible to downsize the vehicular generator controller 1 thereby permitting a cost reduction.

[Fifth Embodiment]

A vehicular power generation controlling device according to a fifth embodiment, to which the present invention is applied, is characterized by its conduction of an autonomous control by setting a normal adjustment voltage of 14.5V or 12.8V when the adjustment voltage setting signal input from the external controller is at steady state, and controlled by the output voltage of the vehicular generator by the external controller when a signal level of the adjustment voltage setting signal is changed. In a case where the adjustment voltage setting signal periodically repeats the low level state and the high level state alternatively, the vehicular power generation controlling device controls so as to suspend power generation of the vehicular generator when at the low level and to generate power when at the high level. The result is that the output voltage of the vehicular generator can be controlled by using a duty ratio signal (adjustment voltage setting signal) input to the C terminal as a direct excitation current controlling signal.

Figure 9:
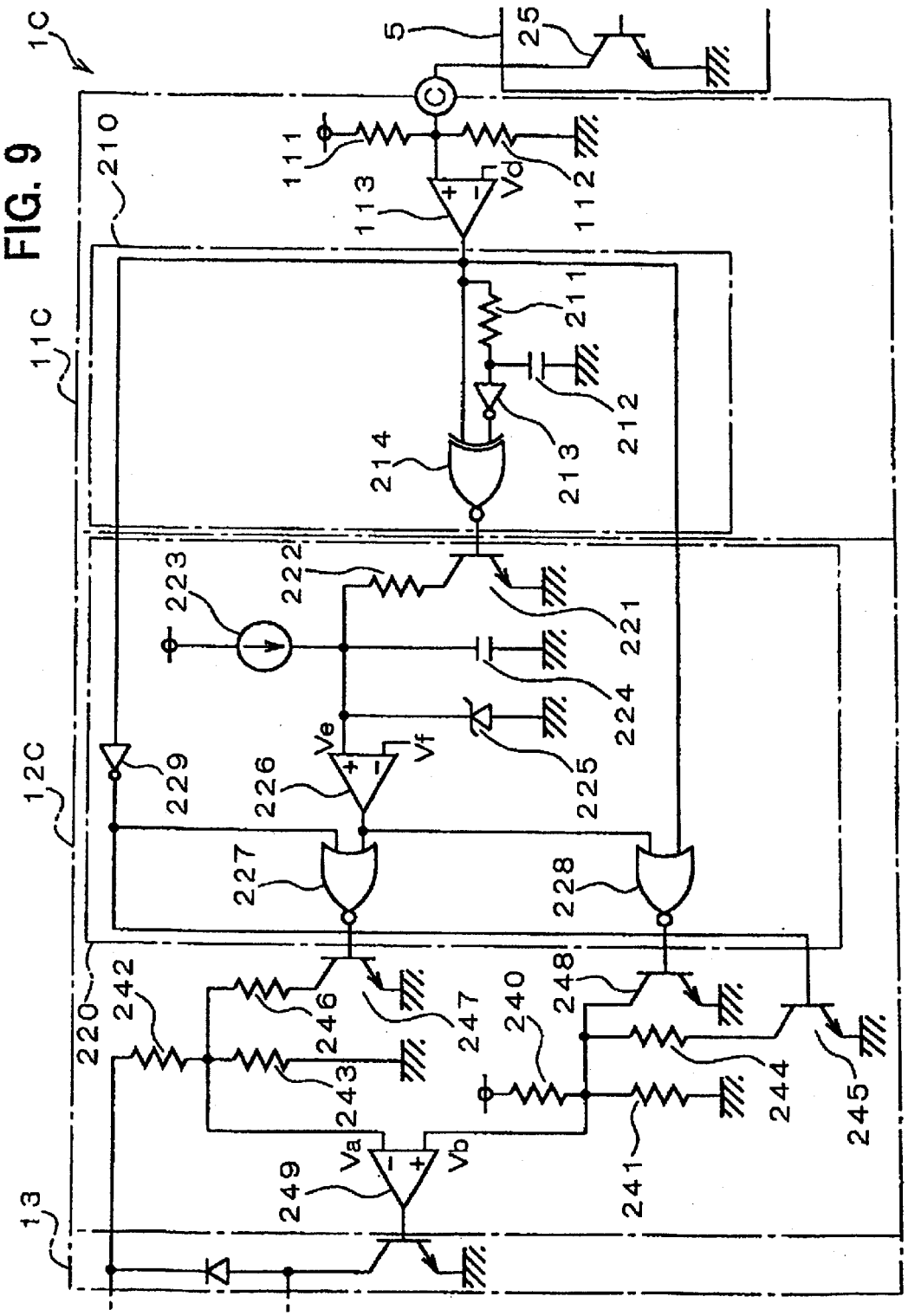
FIG. 9 is a diagram showing a structure of a vehicular power generation controlling system according to a fifth embodiment.

FIG. 9 is a diagram showing a structure of a vehicular power generation controlling device according to the fifth embodiment to which the present invention is applied. The vehicular power generation controlling device 1C as shown in FIG. 9, in comparison to the vehicular generator controller 1 as shown in FIG. 1, replaces the external signal identifying circuit 11 and the adjustment voltage controlling circuit 12 by an external signal identifying circuit 11C and an adjustment voltage controlling circuit 12C, respectively.

The external signal identifying circuit 11C comprises resistors 111 and 112, a voltage comparator 113, and a change signal detection circuit 210. The voltage comparator 113 has a plus terminal connected to the C terminal and a minus terminal to which the reference voltage Vd is applied, and compares voltages at these two terminals. The reference voltage Vd is set to be a value higher than a voltage $V_{CL}$ of the C terminal at a time a low level signal is input from the external controller 5, and lower than a voltage $V_{CH}$ of the C terminal at a time a high level signal is input.

Moreover, the change signal detection circuit 210 includes a resistor 211, a capacitor 212, an inverter circuit 213, and EX-NOR (exclusive NOR) circuit 214. The resistor 211 and the capacitor 212 constitutes a delay circuit, and when an output level of the voltage comparator 113 changes, logic of two input signals of the EX-NOR circuit 214 matches during a predetermined period determined by a time constant of the delay circuit, and an output of the EX-NOR circuit 214 becomes the high level. Specifically, the change signal detection circuit 210 outputs a pulse every time an output state of the voltage comparator 113 changes.

The adjustment voltage controlling circuit 12C comprises a signal processing circuit 220, resistors 240 to 244, and 246, transistors 245, 247 and 249, and a voltage comparator 249. The signal processing circuit 220 is provided with a transistor 221, a resistor 222, a constant current circuit 223, a capacitor 224, a Zener diode 225, a voltage comparator 226, NOR circuits 227 and 228, and an inverter circuit 229. When the transistor 221 is switched to an on-state after a pulse is output from the EX-NOR circuit 214 in the change signal detection circuit 210, the capacitor 224 is discharged instantaneously through the resistor 222. When the transistor 221 is turned to an off-state, the capacitor 224 is charged by electric current supplied from the constant current circuit 223. This charging operation continues until an end-to-end voltage Ve of the capacitor 224 equals a Zener voltage Vz.

When the end-to-end voltage Ve of the capacitor applied to the plus terminal gets higher than the reference voltage Vf applied to the minus terminal, the voltage comparator 226 sets an output to the high level. The reference voltage Vf is set to be a smaller value than the Zener voltage Vz, and the end-to-end voltage Ve of the capacitor 224 is less than the reference voltage Vf while charging is repeated whereas it exceeds the reference voltage Vf when a continuous charge is conducted.

FIGS. 10A–10H are diagrams showing a signal wave input to and output from each part of the vehicular power generation controlling device 1C according to the present embodiment. When the transistor 25 of the external controller 5 is in the off-state, a C terminal voltage $V_C$ becomes $V_{CH}$ so that an output of the voltage comparator 113 becomes the high level (FIGS. 10A and 10B). On the contrary, when the transistor 25 is in the on-state, the C terminal voltage $V_C$ becomes $V_{CL}$, and the output of the voltage comparator 113 becomes the low level (FIGS. 10A and 10B). Every time the output state of the voltage comparator 113 changes, i.e., every time the C terminal voltage changes, the EX-NOR circuit 214 in the change state detection circuit 210 outputs a pulse having a width tp (FIG. 10C).

The signal processing circuit 220 is input by an output signal of the change signal detection circuit 210, and identifies whether the output state of the voltage comparator 113 changes or not, and switches an adjustment voltage corresponding to a duty ratio of the adjustment voltage setting signal input to the C terminal.

When the output of the voltage comparator 113 maintains its high level, the output of the EX-NOR circuit 214 in the change signal detection circuit 210 maintains the low level, and thus, the transistor 221 switches to an off-state. Therefore, the resistor 222 is not fed by current, and therefore, the capacitor 224 is charged to the Zener voltage Vz of the Zener diode 225, and its end-to-end voltage Ve equals the Zener voltage Vz. The reference voltage Vf applied to the minus terminal of the voltage comparator 226 is set to be smaller than the Zener voltage Vz, and fulfills a relationship expressed as Vf<Ve (=Vz), and thus, the output of the voltage comparator 226 becomes the high level. Accordingly, outputs of the NOR circuit 227 and 228 become the low level, and two transistors 246 and 248 are both turned to the off-state. As a result, the reference voltage Vb of the adjustment voltage applied to the plus terminal of the voltage comparator 249 is determined only by a resistance ratio of the resistors 240 and 241, and likewise, the voltage Va applied to the minus terminal of the voltage comparator 249 is determined only by the resistance ratio of the resistors 242 and 243, and therefore, the output voltage of the vehicular generator 2 is controlled by the normal state of 14.5V.

When the C terminal voltage $V_C$ changes from the voltage $V_{CH}$ to $V_{CL}$, the output of the voltage comparator 113 changes from the high level to the low level, so that a predetermined pulse is output from the EX-NOR circuit 214 so as to correspond to the changing state (FIG. 10C). The transistor 221 switched to the on-state only while the pulse is being output, and an electric charge accumulated to the capacitor 224 is discharged instantaneously through the resistor 222 (FIG. 10D). Because a width of the pulse input to the transistor 221 is tp, the transistor 221 returns to its off-state after the time tp is elapsed, and a capacitor 224 is charged by constant current supplied to the constant current circuit 223.

Note that a charging time t of the capacitor 224 is expressed as C·V/I, and a time tf until the end-to-end voltage of the capacitor 224 equals the Zener voltage Vz is expressed as C·Vf/I, where a value of constant current is τ, a electrostatic capacity of the capacitor 224 is C, and the end-to-end voltage V of the capacitor 224 is V. An interval t1 during which the transistor 25 in the external controller 5 is subjected to the on/off control is set to be shorter than the time tf.

When the C terminal voltage $V_C$ is changed from the voltage $V_{CL}$ to $V_{CH}$, the output of the voltage comparator 113 changes from the low level to the high level, so that a predetermined pulse is output from the EX-NOR circuit 214 so as to correspond to the change state (FIG. 10C). Accordingly, as described above, the transistor 221 is switched to the on-state only while the pulse is being output, and an electric charge accumulated to the capacitor 224 is discharged instantaneously through the resistor 222 (FIG. 10D). When the input of the pulse is stopped, the transistor 221 returns to the off-state, and the capacitor 224 resumes charging by the constant current supplied from the constant current circuit 223.

When the C terminal voltage Vc is periodically altered between the voltage $V_{CH}$ and the voltage $V_{CL}$, the capacitor 224 repeats charging and discharging before the end-to-end voltage reaches the reference voltage Vf, and thus, the output of the voltage comparator 226 is maintained at the low level (FIG. 10E). The NOR circuit 228 is input by the output of the voltage comparator 226 and the output of the voltage comparator 113, and outputs a signal which reverses logical OR of those two input signals. Specifically, when the output of the voltage comparator 226 is maintained at the low level while the C terminal voltage $V_c$ periodically changes between the voltage $V_{CH}$ and the voltage $V_{CL}$, a signal that reverses the output of the voltage comparator 113 is output from the NOR circuit 228 (FIG. 10F). The transistor 248 is turned to the on-state when the output of the NOR circuit 228 is on the high level, and the reference voltage Vb of the adjustment voltage applied to the plus terminal of the voltage comparator 249 is set to generally 0V (FIG. 10H).

The NOR circuit 227 is input by the output of the voltage comparator 226 and the signal which reverses the output of the voltage comparator 113 by the inverter circuit 229, and outputs a signal which reverses the logical OR of these two input signals. Specifically, when the output of the voltage comparator 226 is maintained at the low level while the C terminal voltage $V_C$ periodically changes between the voltage $V_{CH}$ and the voltage $V_{CL}$, a signal having the same logic as the output of the voltage comparator 113 is output from the NOR circuit 227 (FIG. 10G). The transistor 247 is turned to the on-state when the output of the NOR circuit 227 is at the high level, and the adjustment voltage can be changed to the high voltage side (16V, for example) equivalently in order to lower the voltage Va applied to the minus terminal of the voltage comparator 249 (FIG. 10H).

Thereafter, the on/off control of the transistor 25 by the external controller 5 is terminated so as to maintain its on-state, thereby bringing the output of the voltage comparator 113 to the low level. At that time, in order to maintain the output of the EX-NOR circuit 214 in the change signal detection circuit 210 at the low level, the transistor 221 in the signal processing circuit 220 is kept in the off-state, so that the end-to-end voltage of the capacitor is elevated to the Zener voltage Vz by exceeding the reference voltage Vf (FIG. 10D). Therefore, the output of the voltage comparator 226 is maintained at the high level, and the output of two NOR circuits 227 and 228 is fixed at the low level (FIGS. 10F and 10G). Moreover, at that time, because the transistor 245 is switched to the on-state by a high level signal which is obtained by reversing the output of the voltage comparator 113 by the inverter 229, the reference voltage Vb of the adjustment voltage is changed to the low voltage side (for example, 12.8V) (FIG. 10H).

As such, in synchronization of falling of the adjustment voltage setting signal transmitted from the external controller 5, the power generation state of the vehicular generator 2 is stopped; on the contrary, in synchronization of rising, the forced power generation can be implemented, and thus, the output voltage of the vehicular generator 2 can be controlled to an arbitrary value by the external controller 5 while the falling and rising of such signal is being repeated. Moreover, in cases other than the above, by conducting an autonomous control, the power generation at the normal state is possible, and a fail-safe function at the time when the signal line is in the open state or short-circuited can be implemented.

In particular, advantages described below occur by conducting a rapid charging of a battery by the forced power generation which is conducted by setting the adjustment voltage at high by a control of the external controller 5.

(1) By conducting the forced power generation under deceleration of the vehicle, it is possible to assist engine braking.

(2) Because it is possible to fix the output current of the vehicular generator, fluctuation of the power generation torque can be reduced. Thereby, a hunting vibration of the engine due to the output current fluctuation of the vehicular generator can be reduced, thus enabling a stable engine speed.

(3) Because it is possible to arbitrarily change the duty ratio of the adjustment voltage setting signal, it becomes possible to raise the output voltage of the vehicular generator rapidly or slowly. For example, in order to enhance an effect of engine braking, it is desirable that the output voltage is elevated rapidly by increasing the duty ratio. In a case where headlights are illuminated, a lesser voltage fluctuation is desirable, and therefore, it is desirable that the output voltage is elevated slowly by decreasing the duty ratio.

It should be noted that the duty ratio of the vehicular generator 2 at that point (the duty ratio upon energizing by the excitation current control circuit 13 in the vehicular power generation controlling device) can be known by monitoring an FR terminal provided to a conventional vehicular power generation controlling device. For example, the FR terminal is connected to a collector of the transistor 131 in the excitation current control circuit 13 through a current limiting element, and a signal corresponding to the on/off state of the transistor 131 is output thereto.

By conducting forced power generation suppression or power generation suspension by setting the smaller duty ratio by the control of the external controller 5 than a normal battery voltage control, the following advantages occur.

(1) It is possible to terminate the power generation state under acceleration of the vehicle only for an arbitrary time. For example, because it is possible to set an arbitrary adjustment voltage lower than 12.8V, it is possible to further enhance an effect of the power generation suppression. Moreover, when the signal line is under abnormal condition, a fail-safe function for recovering to the normal power generation can be implemented.

(2) It is possible to terminate the power generation state of the vehicular generator when starting an engine. For example, the excitation current is controlled at a fixed value, 5 to 25%, of the duty ratio when starting the engine, and after detecting the start of the engine, the external controller 5 conducts a control to release the fixed duty ratio. When suppression of a rapid increase of the output is desired, the duty ratio may be increased gradually to increase the output current slowly.

(3) Because it is possible to change the duty ratio arbitrarily, it is possible to lower the voltage rapidly or slowly. Moreover, in order not to lose acceleration of the vehicle, the duty ratio is set to its minimum so as not to generate power. When the headlights are illuminated, it is better that the voltage fluctuation be less, and thus, it is desirable that the output voltage be lowered slowly by lessening the degree of decrease of the duty ratio.

It should be noted that the interval t1 for on/off control of the transistor 25 in the external controller 5 is set to be a shorter interval (for example, from several milliseconds to tens of milliseconds) so that a voltage fluctuation and a current fluctuation does not occur at the vehicular generator 2. Setting the interval t1 short is necessary in order to achieve a short response time when controlling the output voltage of the vehicular generator 2.

Moreover, by employing the charging and discharging operation of the capacitor 224, the signal processing circuit 220 produces a signal that becomes the low level while a periodical pulse is input. Alternatively, equivalent operation can be implemented by a digital circuit.

[Sixth Embodiment]

A vehicular power generation controlling device according to a sixth embodiment, to which the present invention is applied, has the same structure as the vehicular power generation controlling device 1C according to the fifth embodiment described above, and in combination with an external controller having added functions, the power generation controlling system of the present embodiment is constructed. In particular, the power generation controlling system of the present embodiment is characterized so that by controlling the power generation state of a vehicular generator 2 by an external controller 5A, an appropriate voltage is supplied to a special electric load of an electric heating catalyst or the like, which uses a voltage higher than a normal battery voltage.

Figure 11:
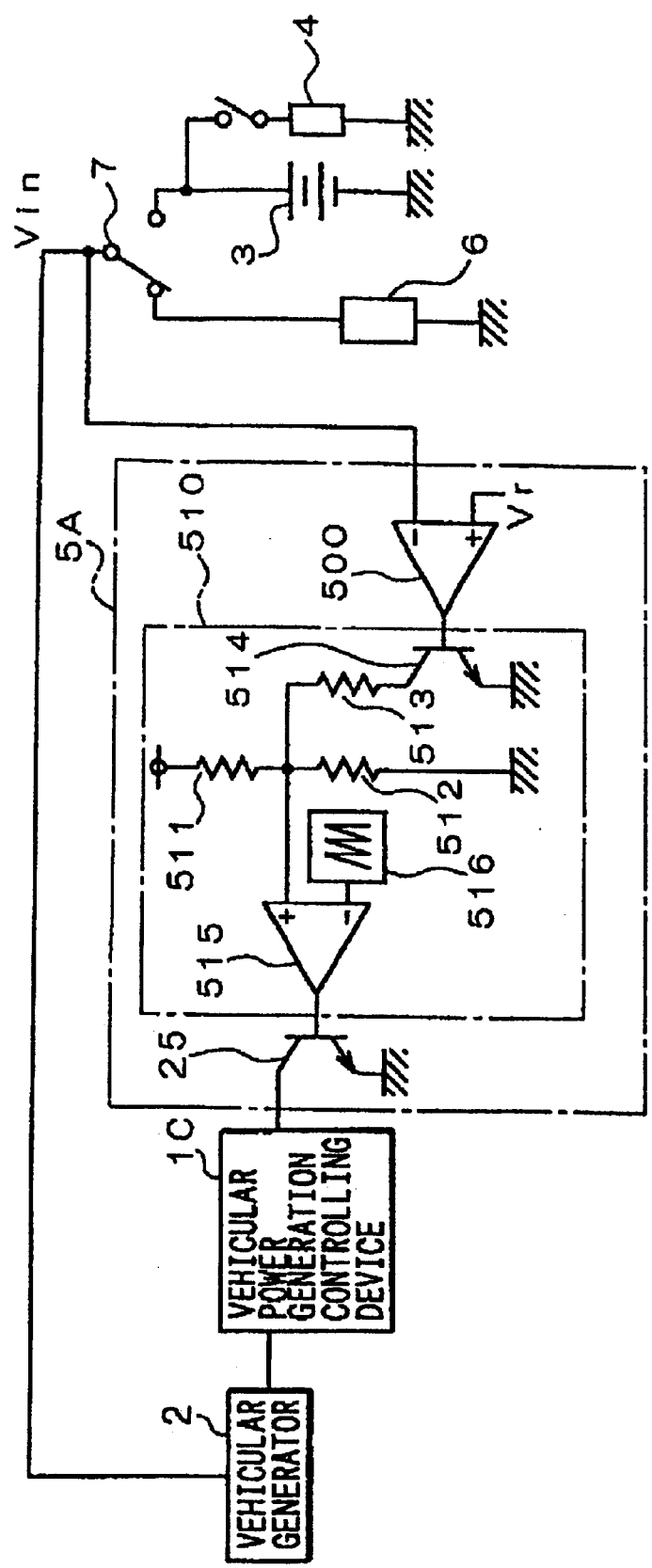
FIG. 11 is a diagram showing a structure of a power generation controlling system according to a sixth embodiment.

FIG. 11 is a diagram showing a structure of a power generation controlling system of the present embodiment. The power generation controlling system as shown in FIG. 11 controls the vehicular power generation controlling device 1C shown in FIG. 9 by using the external controller 5A, and controls a voltage Vin applied to the electric heating catalyst load 6 to its optimum value. The external controller 5A comprises a voltage comparator 500, a duty setting circuit 510, and a transistor 25. When an output voltage Vin of the vehicular generator 2 applied to a minus terminal is lower than a predetermined setting voltage Vr applied to a plus terminal, the voltage comparator 500 brings its output to the high level.

The duty setting circuit 510 controls the on/off state of the transistor 25 so as to output an adjustment voltage setting signal having a predetermined duty ratio toward the vehicular power generation controlling device 1C when the output of the voltage comparator 500 is in the high level. The duty setting circuit 510 comprises resistors 511, 512 and 513, a transistor 514, a voltage comparator 515, and a triangular wave generation circuit 516. When the transistor 514 is switched to the on-state due to a high level of voltage comparator 500 output, the resistor 512 is connected with the resistor 513 in parallel, and thus, a voltage applied to a plus terminal of the voltage comparator 515 is changed to the low voltage side. Therefore, from the external controller 5A, a signal having a duty ratio which is different when the transistor 514 is in the on-state or the off-state is output. For example, when the transistor 514 is in the off-state, the signal having 5% of the duty ratio is output, while when the transistor 514 is in the on-state, a signal having a 95% of the duty ratio is output.

Figure 12:
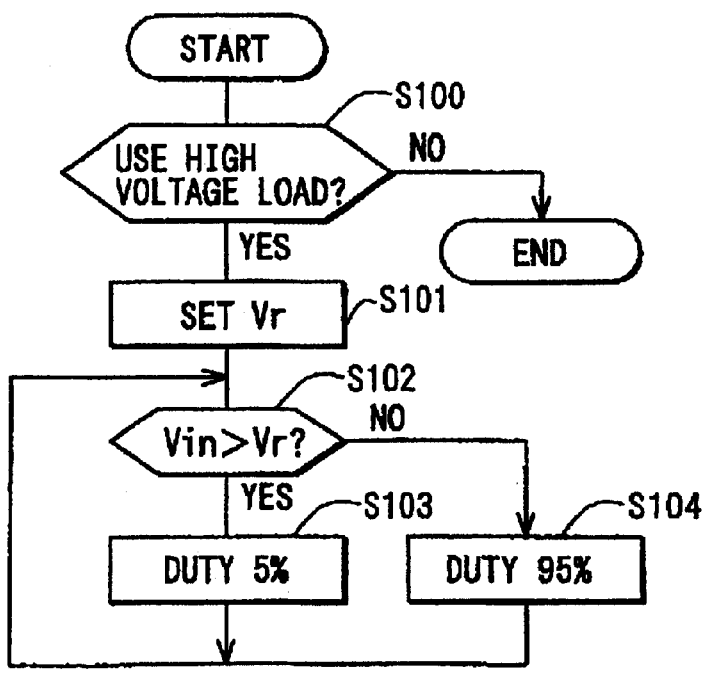
FIG. 12 is a flow diagram showing an operation procedure of an external controller according to the sixth embodiment.

FIG. 12 is a flow diagram showing operating procedures of the external controller 5A of the present embodiment. FIG. 13 is a timing diagram showing an input/output wave for each part included in the power generation controlling system of the present embodiment. The external controller 5A identifies whether or not to use the electric heating catalyst load 6 that is a high voltage load (step S100), and when it is not to be used, the process is terminated without conducting a controlling operation according to the present embodiment.

When the high voltage load is to be used, the external controller 5A sets a predetermined setting voltage Vr applied to the plus terminal of the voltage comparator 500 (step S101). Thereafter, the voltage comparator 500 compares the voltage Vin applied to the minus terminal to the setting voltage Vr applied to the plus terminal (step S102), and when the comparison yields a Vin>Vr relationship, it outputs a signal of the low level. At that time, the transistor 514 switches to an off-state, and thus, a voltage applied to the plus terminal of the voltage comparator 515 becomes high. Therefore, as the signal having 5% of the duty ratio is output from the external controller 5A, it conducts the on/off control of the transistor 25 (step S103).

On the contrary, when the comparison yields Vin<Vr relationship, the voltage comparator 500 outputs a high level signal. At that time, the transistor 514 switches to the on-state, and thus, a voltage applied to the minus terminal of the voltage comparator 515 switches to low. Therefore, as a signal having a duty ratio of 95% is output from the external controller 5A, it conducts the on/off control of the transistor 25 (step S104).

Figure 13A:
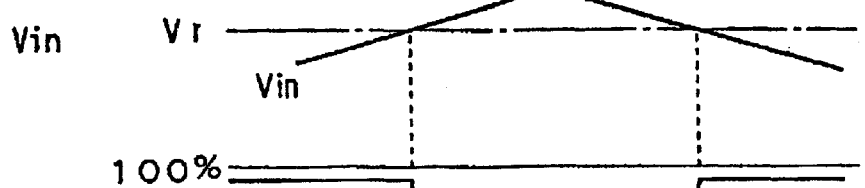
FIGS. 13A–13D are timing diagrams showing input/output wave forms of each part included in the power generation controlling system according to the sixth embodiment.
Figure 13B:
Figure 13C:
Figure 13D:
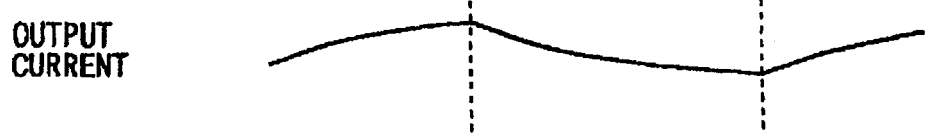

As such, when the output voltage Vin of the vehicular generator 2 is lower than the setting voltage Vr, the setting duty ratio becomes 95% (FIGS. 13A and 13B). When the adjustment voltage setting signal having such a duty ratio is input to the C terminal of the vehicular power generation controlling device 1C (FIG. 13C), a power generation state of the vehicular generator 2 is controlled under a state in which power is generated fully. Therefore, the output current of the vehicular generator 2 is increased (FIG. 13D). Moreover, when the output voltage Vin of the vehicular generator 2 is higher than the setting voltage Vr, the setting duty ratio becomes 5% (FIGS. 13A and 13B). When the adjustment voltage setting signal having such duty ratio is input to the C terminal of the vehicular power generation controlling device 1C (FIG. 13C), a power generation state of the vehicular generator 2 is controlled under a state in which power generation is generally terminated. Therefore, the output current of the vehicular generator 2 decreases (FIG. 13D). By repeating the above operation, the output current of the vehicular generator 2 corresponding to the setting voltage Vr can be supplied to the electric heating catalyst load 6.

For example, the electric heating catalyst load 6 significantly deteriorates when heated by applying the fixed voltage of 30V. Therefore, it is desirable that an applied voltage is set low when it is new (for example, 20V), and the applied voltage is set higher (for example, 30V) when it gets older. By using the power generation controlling system according to the present embodiment, it is possible to variably control a voltage applied to the electric heating catalyst load 6 by varying a value of the setting voltage Vr. When an abnormal voltage is detected at a time of driving the electric heating catalyst load 6 (for example, when a high voltage is applied), it is possible to suspend the power generation state of the vehicular generator 2 by setting the duty ratio at 5%, thus bringing a consumption current at the electric heating catalyst load 6 to 0.

The case has been described where the duty setting circuit 510 conducts switch-control of the fixed signal of the duty ratio of 5% and 95% corresponding to the output of the voltage comparator 500. Alternatively, the output of the voltage comparator 500 may be subjected to a pulse-width modulation by using an up/down counter to provide a duty-control by a signal of 5 to 95%.

In the power generation controlling system of the present embodiment, high voltages are handled. Therefore, an excitation current limitation function may be included in the excitation current limitation circuit 13 of the vehicular power generation controlling device 1C for excess current protection.

[Seventh Embodiment]

A vehicular power generation controlling device according to a seventh embodiment, to which the present invention is applied, has the same structure as the vehicular power generation controlling device 1C according to the fifth embodiment described above, and by combining an external controller having added functions, the power generation controlling system of the present embodiment is constructed. In particular, an external controller included in the power generation controlling system of the present embodiment is characterized in that the power generation amount (duty ratio) can be detected therein.

FIG. 14 is a diagram showing a structure of the power generation controlling system according to the present embodiment. The power generation controlling system as shown in FIG. 14 controls the vehicular power generation controlling device 1C shown in FIG. 9 by using the external controller 5B, and detects the power generation state of the vehicular generator 2 inside the external controller 5B. The external controller 5B comprises a voltage setting circuit 531, a voltage comparator 532, a duty setting circuit 533, a duty detection circuit 535, an information processing circuit 536, and transistor 25. The voltage setting circuit 531 sets a setting voltage Vr of the vehicular generator 2 which is a target of adjustment. When an output voltage Vin of the vehicular generator 2 applied to a minus terminal is lower than a setting voltage Vr set by the voltage setting circuit 531, the voltage comparator 532 brings its output to the high level.

The duty setting circuit 533 sets a duty ratio corresponding to the output state of the voltage comparator 532 and a processed result of the information processing circuit 536. The duty setting circuit 533 controls the on/off state of the transistor 25 so as to output an adjustment voltage setting signal having the set duty ratio toward the C terminal of the vehicular power generation controlling device 1C. By monitoring a collection potential of the transistor 25, the duty detection circuit 535 detects the duty ratio which shows the power generation state of the vehicular generator 2. The detected result is input to the information processing circuit 536, and is set to other controlling devices (not shown) to be used for engine control and the like.

In addition to the detected result by the duty detection circuit 535, the starter information, vehicle speed information, temperature information, engine speed information and the like are input into the information processing circuit 536, and based on a comprehensive result of such information, it changes the setting voltage Vr set in the voltage setting circuit 531 or a value of the duty ratio set by the duty setting circuit 533 appropriately. Thereby, the power generation state of the vehicular generator 2 is controlled so as to correspond to a state of the vehicle.

As such, in the power generation controlling system according to the present embodiment, the power generation state of the vehicular generator 2 is detected in the external controller 5B based on the operation state of the transistor 25, and thus, an FR terminal is not necessary, unlike the conventional vehicular power generation controlling device. Therefore, it is possible to reduce a number of signal lines for connecting the FR terminal and the external controller.

[Eighth Embodiment]

A vehicular power generation controlling device according to an eighth embodiment, to which the present invention is applied, has the same structure as the vehicular power generation controlling device 1C according to the fifth embodiment described above. By combining the vehicular power generation controlling device with an external controller 5C having added functions, the power generation controlling system of the present embodiment is constructed. In particular, an external controller included in the power generation controlling system of the present embodiment is characterized in that the external controller controls a power generation state, temporarily, in order to prevent a battery voltage generated at a time of electric load connection from dropping.

Figure 15:
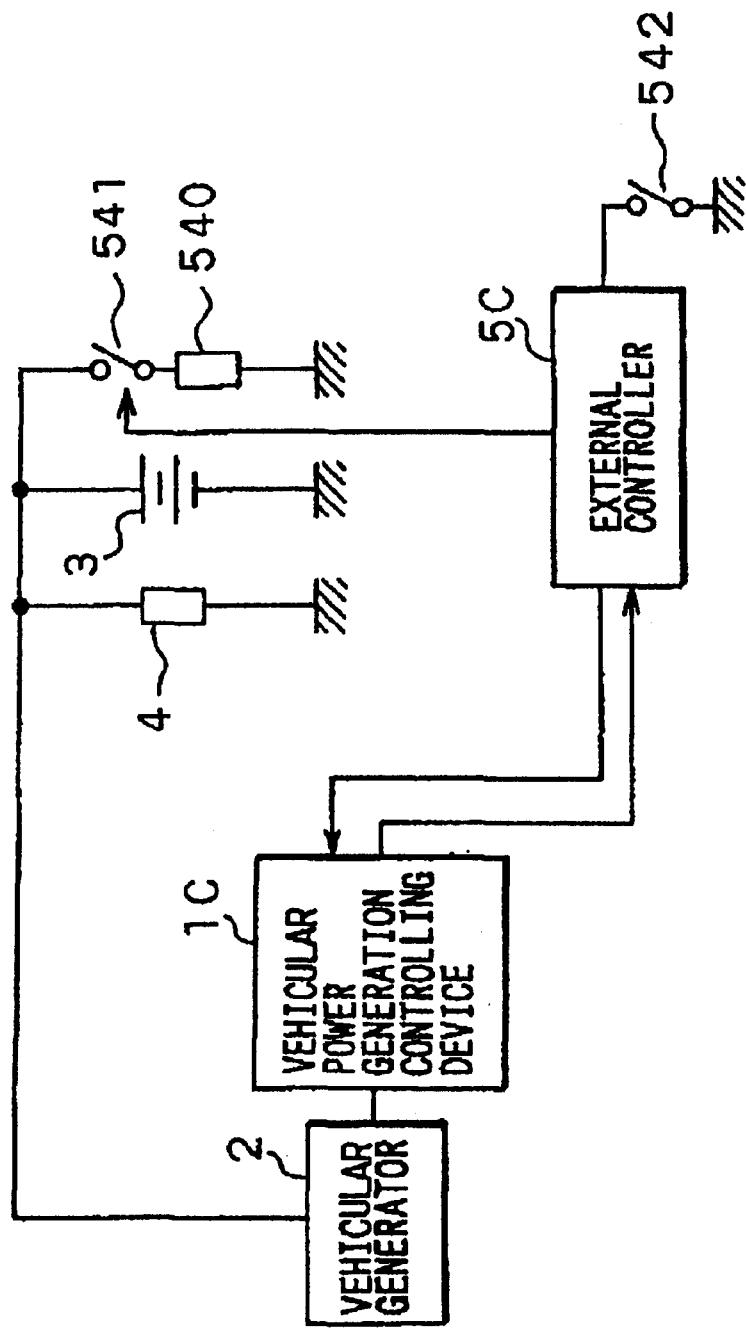
FIG. 15 is a diagram showing a structure of a power generation controlling system according to an eighth embodiment.

FIG. 15 is a diagram showing a structure of the power generation controlling system according to the present embodiment. The power generation controlling system as shown in FIG. 15 controls the vehicular power generation controlling device 1C shown in FIG. 9 by using the external controller 5C. In the power generation controlling system, another electric load 540 is connected through a load switch 541, to the vehicular generator 2, a battery 3 and an electric load 4. FIGS. 16A–16G is a timing diagram showing a signal wave of each part included in the power generation controlling system of the present embodiment.

In a state before an operation switch 542 connected to the external controller 5C is thrown, the adjustment voltage should be set to the normal state of 14.5V, and a load current of about 10A, for example, should be fed to the electric load 4. At that time, the battery 3 is fully charged, and substantially no current should be fed thereto.

Knowing the power generation current of the external controller 5C (FIG. 16E) is possible by monitoring an FR terminal provided with the conventional vehicular power generator controller, or by the duty detection circuit 535 shown in FIG. 14. Under such circumstances, when the operation switch 542 is thrown to use the load 540 (FIG. 16A), the external controller 5C inputs an adjustment voltage setting signal having a predetermined duty ratio to the C terminal of the vehicular power generation controlling device 1C (FIG. 16C), so as to switch the adjustment voltage from 14.5V to 16V. Thereby, for example, the power generation current of the vehicular generator 2 is increased to 20A (FIG. 16E). The increment of the current is supplied to the battery 3, and thus, a terminal voltage of the battery 3 is temporarily elevated (FIG. 16D).

Next, the external controller 5C concurrently connects the electric load 540 to the vehicular generator 2 by throwing the load switch 541 and suspends the adjustment voltage setting signal having the predetermined duty ratio having been input to the C terminal of the vehicular power generation controlling device 1C. For example, when the load current of 10A is fed to the current load 540, the load current is supplied to the electric load 540 from the battery 3 whose terminal voltage is temporarily increased (FIGS. 16F and 16G). Thereafter, the output voltage of the vehicular generator 2 is controlled at 14.5V, and the power generation current of 10A is supplied to the electric loads 4 and 540, respectively.

As such, by connecting the electric load 540 after increasing the battery voltage by temporarily increasing the adjustment voltage, it is possible to temporarily supply the load current to the battery 3, thus preventing the output voltage of the vehicular generator 2 from becoming lower than 14.5V, which is the adjustment voltage of the normal state. Therefore, it is possible to avoid a phenomenon such that the headlights and the like dim due to a lowered voltage at the time of connecting the electric load 540.

[Ninth Embodiment]

Figure 17:
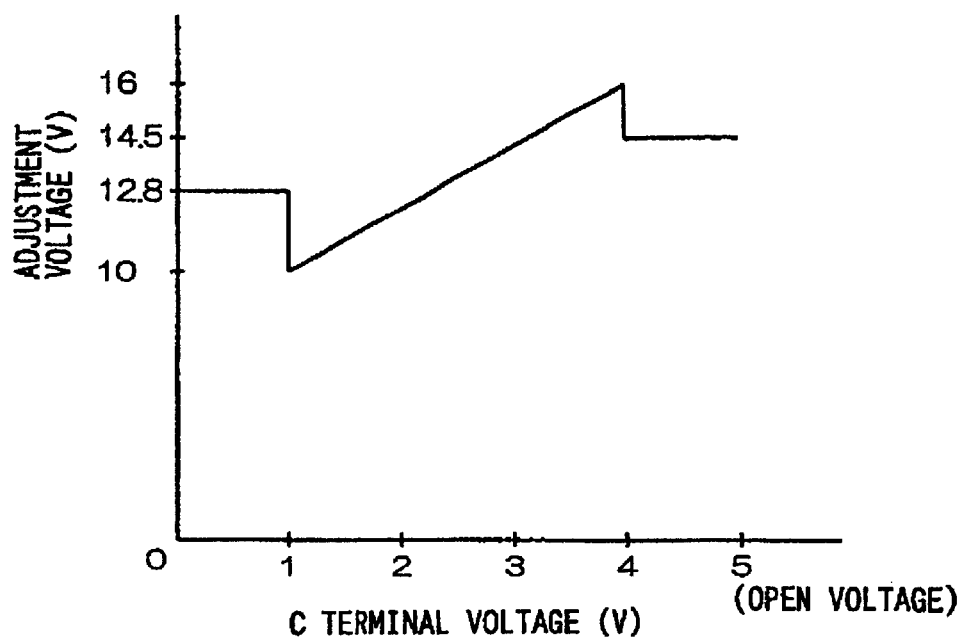
FIG. 17 is a diagram showing one example of an adjustment voltage which is set by variably controlling a voltage of a C terminal in a conventional vehicular power generation controlling device.

Conventionally, a vehicular power generation controlling device is known, in which an adjustment voltage can be set arbitrarily within a predetermined range by variably controlling a voltage of a C terminal. For example, as shown in FIG. 17, when the C terminal voltage is equal or greater than 4V, the adjustment voltage is set to 14.5V, and when equal to or less than 1V, the adjustment voltage is set to 12.8V. Moreover, if the C terminal voltage is between the above values, the adjustment voltage is set variably within a range of 10 to 16 V so as to correspond to a value of the C terminal voltage.

A vehicular power generation controlling device according to the present embodiment is characterized in that when the C terminal voltage changes, the above-described control of the adjustment voltage is not conducted, but a forced power generation suspension and power generation state is controlled.

Figure 18:
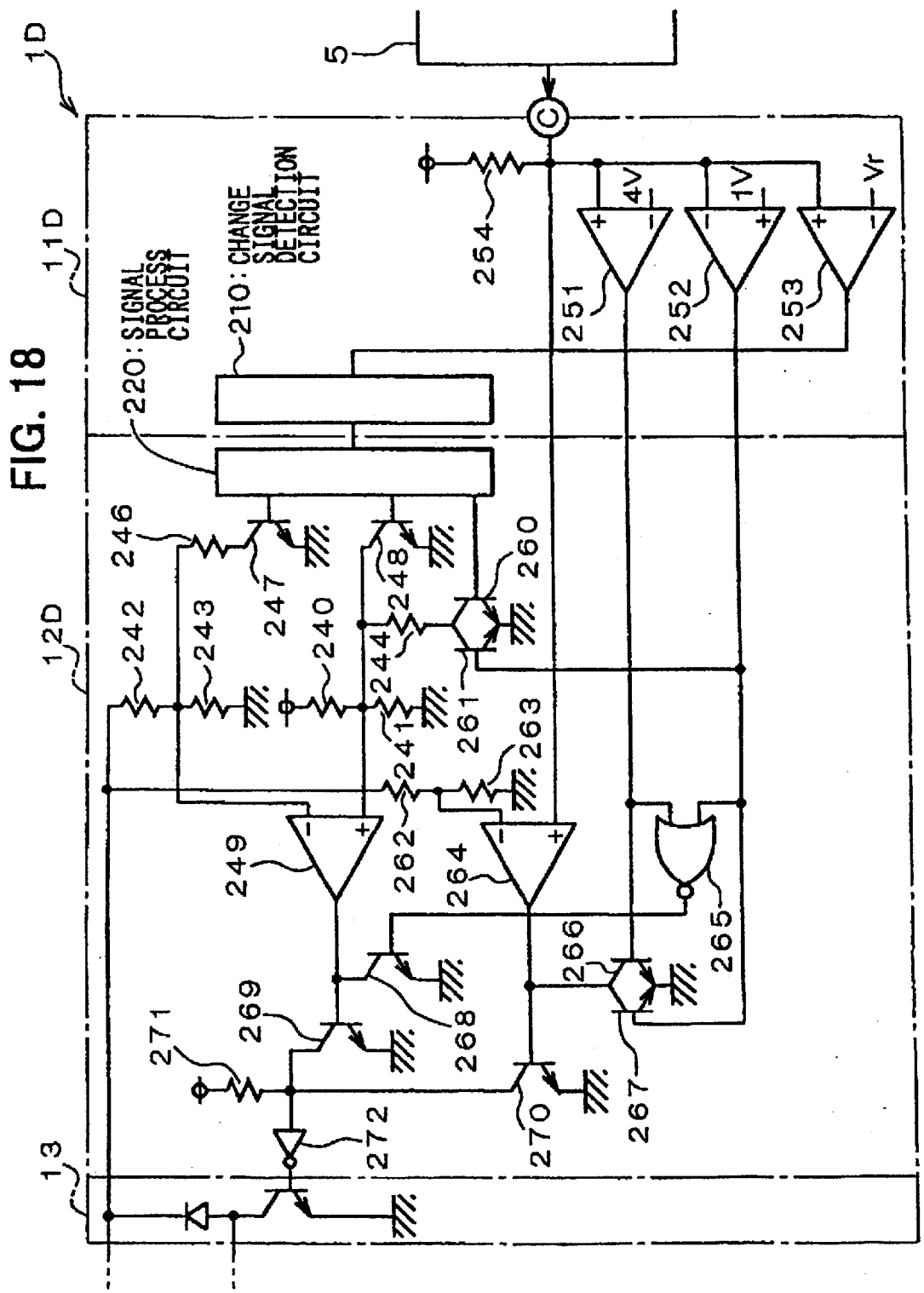
FIG. 18 is a diagram showing a structure of a vehicular power generation controlling system according to a ninth embodiment.

FIG. 18 is a diagram showing a structure of the vehicular generator controller of the present embodiment. The vehicular controller generator 1D as shown in FIG. 18, in comparison to the vehicular power generation controlling device 1 shown in FIG. 1, replaces the external signal identifying circuit 11 and the adjustment controlling circuit 12 with an external signal identifying circuit 11D and an adjustment voltage controlling circuit 12D, respectively.

The external signal identifying circuit 11D comprises a change signal detection circuit 210, three voltage comparator 251, 252 and 253, and a resistor 254. Herein, the change signal detection circuit 210 is the same as what is shown in FIG. 9. The adjustment voltage controlling circuit 12D comprises a signal processing circuit 220, resistors 240 to 244, 246, 262, 263, and 271, transistors 247, 248, 260, 261, 266 to 270, voltage comparators 249 and 264, an NOR circuit 265, and an inverter circuit 272. Herein, the signal processing circuit 220 is the same as that is shown in FIG. 9.

FIGS. 19A(a)–19E(b) are diagrams showing a signal wave input to and output from each part of the vehicular power generation controlling device 1D according to the present embodiment. For example, a case where the setting voltage Vr is set to 0.5V is shown. In the diagram, FIG. 19A(a) (of the left hand side) is a signal wave in a case where the C terminal voltage is changed a periodically, while FIG. 19A(b) (of the right hand side) is a signal wave in a case where the C terminal voltage is changed periodically.

In a case where the C terminal voltage Vc is equal to or greater than 4V (FIG. 19A), the C terminal voltage Vc applied to a plus terminal of the voltage comparator 253 becomes consistently higher than the setting voltage Vr applied to a minus terminal, and thus, an output of the voltage comparator 253 is maintained at the high level. Therefore, with reference to FIG. 9, a pulse is not output from the change signal detection circuit 210, so that three outputs of the signal processing circuit 220 are maintained at the low level. Accordingly, an adjustment voltage set by the voltage comparator becomes 14.5V of a normal state set by a resistance ratio of the resistors 240 and 241, and each resistant ratio of the resistors 242 and 243. Moreover, the output of the voltage comparator 251 transitions to the high level (FIG. 19B), and the output of the voltage comparator 252 transitions to the low level (FIG. 19C). The transistor 266 is switched to the on-state, and the transistor 267 is switched to the off-state. The output of the NOR circuit 265 is switched to the low level (FIG. 19D), and thus, the transistor 268 is switched to the off-state.

Therefore, the transistor 270 is switched to the off-state, and thus, the excitation current controlling circuit 13 is controlled by the transistor 269. That is, the transistor 269 is controlled by the output signal of the voltage comparator 249, and the adjustment voltage is set to 14.5V which corresponds to the normal state (FIG. 19B).

When the C terminal voltage Vc is equal to or less than 1V (FIG. 19A), while the C terminal voltage Vc applied to the plus terminal of the voltage comparator 253 becomes consistently lower than the setting voltage Vr applied to the minus terminal, the output of the voltage comparator 253 is maintained at the low level, whereas when the plus terminal of the voltage comparator 253 becomes consistently higher, the output of the voltage comparator 253 is maintained at the high level. Accordingly, a pulse is not output from the change signal detection circuit 210, and thus, three outputs of the signal processing circuit 220 are maintained at the low level.

Because the output of the voltage comparator 252 becomes high level (FIG. 19C), the transistor 261 is switched to the on-state, and the adjustment voltage set by the voltage comparator 249 becomes 12.8V because the resistor 241 and the resistor 244 are connected in parallel (FIG. 19B). Moreover, the output of the voltage comparator 251 switches to a low level (FIG. 19B), the transistor 266 switches to the off-state, and the transistor 267 switches to the on-state. Because the output of the NOR circuit 265 becomes low level (FIG. 19D), the transistor 268 switches to the off-state. Therefore, the transistor 270 switches to the off-state, and the excitation current controlling circuit 13 is controlled by the transistor 269. Specifically, the transistor 269 is controlled by the output signal of the voltage comparator 249, and the adjustment voltage of 12.8V is set.

When the C terminal voltage Vc is within a range of 1 to 4V (FIG. 19A), outputs of two voltage comparators 251 and 252 transition to a low level. Therefore, the NOR circuit 265 transitions to the high level (FIG. 19D), and the transistor 268 transitions to the on-state. Accordingly, the excitation current controlling circuit 13 is controlled by the transistor 270 connected to the voltage comparator 264. The C terminal voltage corresponding to the reference voltage of the adjustment voltage is applied to the plus terminal of the voltage comparator 264, and the adjustment voltage is set so that a value, which is obtained by dividing the output voltage of the vehicular generator 2 by the resistors 262 and 263, equals the C terminal voltage (for example, 11V) (FIG. 19E).

For example, as shown in FIG. 19A(b), when a state of the C terminal voltage Vc repeatedly changes across the setting voltage Vr, either one of the outputs of the voltage comparator 251 and 252 transitions to a high level (FIGS. 19B and 19C), and thus, either one of the transistors 266 and 267 switches to the on-state. Moreover, because the output of the NOR circuit 265 transitions to a low level (FIG. 19D), the transistor 268 transitions to the off-state. Therefore, the transistor 270 transitions to the on-state, and the excitation current controlling circuit 13 is controlled by the transistor 269 connected to the voltage comparator 249. Therefore, the same controlling operation as the vehicular power generation controlling device 1C of the fifth embodiment described with reference to FIG. 9 is performed, whereby the power generation state of the vehicular generator 2 can be directly controlled by the duty ratio of the adjustment voltage setting signal input to the C terminal (FIG. 19E).

As such, the vehicular power generation controlling device 1D of the present embodiment can set the adjustment voltage to an arbitrary value by the voltage value of the C terminal voltage Vc, and can change the adjustment voltage in a wider ranger by periodically changing the adjustment voltage setting signal input to the C terminal. Therefore, it can be used as a part of the power generation controlling systems described in embodiments six through eight.

FIGS. 20A–20D are timing diagrams showing another operation procedure of the vehicular power generation controlling device 1D according to the present embodiment. For example, a case will be considered in which a conventional adjustment voltage setting after the power generation suspension or a forced power generation is performed during a predetermined duration when the setting voltage Vr is set to 3V. The power generation suspension or the forced power generation is performed by using a timer time at the signal processing circuit 220 (a time period until which the capacitor as shown in FIG. 9 is charged and its end-to-end voltage reaches the setting voltage Vf).

Figure 20A:
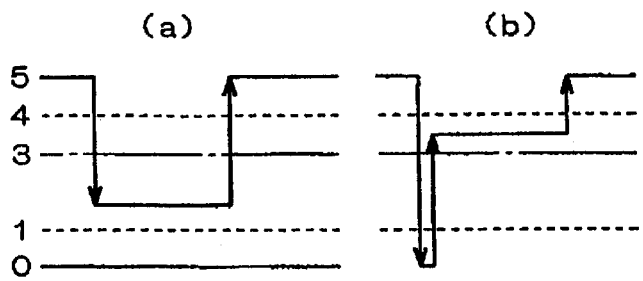
FIGS. 20A(a)–20D(b) are timing diagrams showing another operation procedure of the vehicular power generation controlling device according to the ninth embodiment.
Figure 20B:
Figure 20C:
Figure 20D:
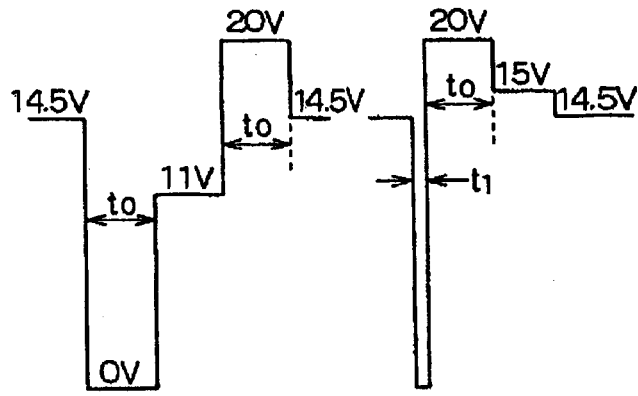

FIGS. 20A(a) through 20D(a) are timing diagrams showing a case where the adjustment voltage is switched from the normal state of 14.5V to the low voltage (for example, 1V). In this case, when the C terminal voltage Vc changes from 5V to 1.5V (FIG. 20A), after controlling the adjustment voltage to be 0V only during a predetermined time period t0, the adjustment voltage is set to 11V which is determined when the voltage Vc equals 1.5V (FIG. 20D). In a case where the adjustment voltage returns to the normal state, when the C terminal voltage Vc is changed from 1.5V to 5V (FIG. 20A), after the adjustment voltage is controlled to be 20V only during a predetermined time t0, the adjustment voltage is set to 14.5V which is determined when the voltage Vc equals 5V (FIG. 20D).

FIGS. 20A(b) through 20D(b) are timing diagrams showing a case where the adjustment voltage is switched from the normal state of 14.5V to the high voltage (for example, 15V). In this case, the C terminal voltage Vc is changed from 5V to 0V, thereafter it is changed to 3.5V (FIG. 20A(b)), so that after the adjustment voltage is controlled and equal to 0V during a short time t1, the adjustment voltage is set to 20V during a time t0 which is sufficiently longer than the time t1, and thereafter the adjustment voltage is set to 15V which is determined when the voltage Vc equals 3.5V (FIG. 20D(b)). Moreover, by setting the voltage Vc to 5V the adjustment voltage is returned to the normal state of 14.5V to perform the control. If the power generation suspension and the forced power generation is desired to be performed longer than the timer time, a signal state input to the C terminal may be switched at an interval shorter than the timer time as shown in FIG. 19A(b) through FIG. 19E(b).

[Tenth Embodiment]

Figure 21:
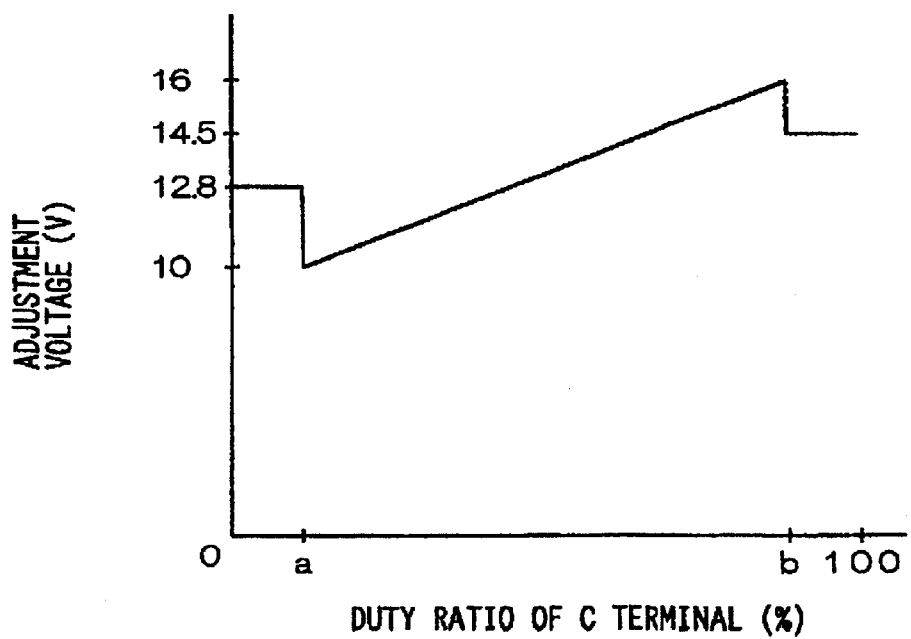
FIG. 21 is a diagram showing one example of an adjustment voltage which is set by variably controlling a duty ratio of a signal input to a C terminal in a conventional vehicular power generation controlling device.

Conventionally, a vehicular power generation controlling device is known, in which an adjustment voltage can be set arbitrarily within a predetermined range by variably controlling a duty ratio of a signal input to the C terminal. For example, as shown in FIG. 21, when the duty ratio of the signal input to the C terminal is equal to or greater than b%, the adjustment voltage is set to 14.5V, and when equal to or less than a%, the adjustment voltage is set to 12.8V. When the duty ratio of the signal input to the C terminal is between a% to b%, the adjustment voltage is set variably within a range of 10 to 16 V so as to correspond to the duty ratio.

A vehicular power generation controlling device of the present embodiment is characterized in that when the signal input to the C terminal is changing, the above-described control of the adjustment voltage is not performed, but a control of the forced power generation suspension or the power generation is performed.

Figure 22:
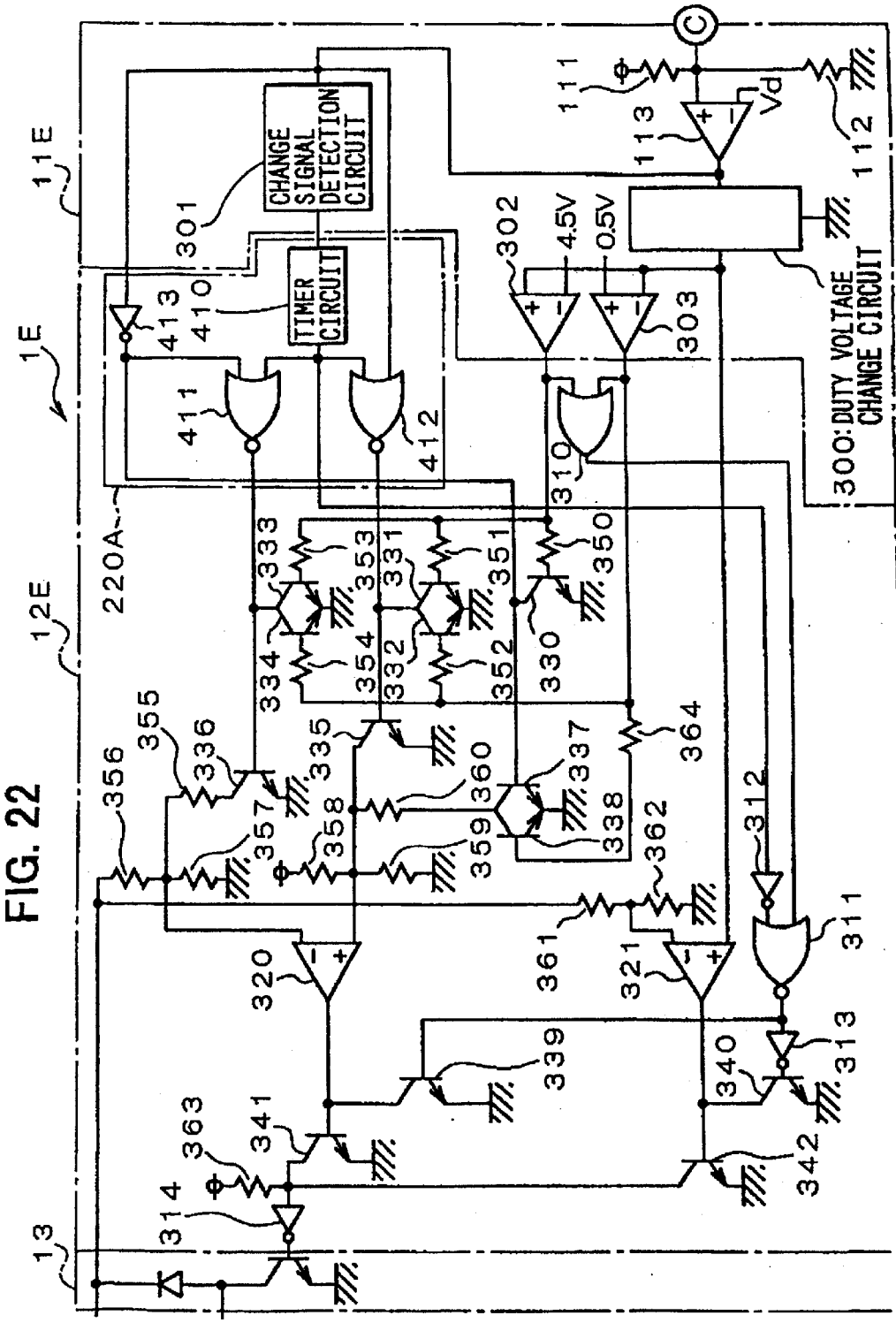
FIG. 22 is a diagram showing a structure of a vehicular power generation controlling device according to a tenth embodiment.

FIG. 22 is a diagram showing a structure of the vehicular power generation controlling device according to the present embodiment. The vehicular power generation controlling device 1E as shown in FIG. 22, in comparison to the vehicular power generation controlling device 1 shown in FIG. 1, replaces the external signal identifying circuit 11 and the adjustment voltage controlling circuit 12 with an external signal identifying circuit 11E and an adjustment voltage controlling circuit 12E, respectively. The external signal identifying circuit 11E comprises resistors 111 and 112, voltage comparators 113, 302 and 303, and a duty/voltage converter circuit 300, and a change signal detection circuit 301.

The adjustment voltage controlling circuit 12E comprises an OR circuit 310, NOR circuits 311, 411, and 412, inverter circuits 312 to 314 and 413, voltage comparators 320 and 321, transistors 330 to 342, resistors 350 to 363 and a timer circuit 410. The timer circuit 410, the inverter circuit 413, and the NOR circuits 411 and 412 form a signal processing circuit 220A. The signal processing circuit 220A performs basically the same operation as the signal processing circuit 220 described in the fifth embodiment described above.

FIGS. 23A–23L and FIGS. 24A–24L are diagrams showing signal waves input to and output from each part of the vehicular power generation controlling device 1E according to the present embodiment. For example, FIG. 23 shows a case where the adjustment voltage setting signal with 10% duty ratio is input to the C terminal, and FIG. 24 shows a case where the adjustment voltage setting signal with 90% duty ratio is input to the C terminal.

When the adjustment voltage setting signal with 10% duty ratio is input to the C terminal, the change signal detection circuit 301 detects a change of the adjustment voltage setting signal, and outputs a predetermined pulse (FIGS. 23A and 23B). The timer circuit 410 is activated by the pulse and maintains the output at the high level during a predetermined time t0 (FIG. 23C).

Based on the output of the voltage comparator corresponding to a change of the C terminal voltage, the duty/ voltage converter circuit 300 measures a duty ratio D (=(Ta/Ts)×100) by using an interval Ts of the C terminal voltage change and a time Ta from the rising of the C terminal voltage until the falling thereof, and outputs $V_D$=1.5V which is a voltage corresponding to D=10% (FIG. 23E).

Because the fixed voltage of 4.5V is applied to a minus terminal of the voltage comparator 302, an output transitions to a high level when the voltage applied to a plus terminal is equal to or greater than 4.5V, and the output transitions to a low level when equal to or less than 4.5V. Because the fixed voltage of 0.5V is applied to a plus terminal of the voltage comparator 303, the output transitions to a high level when a voltage applied to a minus terminal is equal or less than 0.5V, and transitions to a low level when equal to or greater than 0.5V.

When the duty ratio of the C terminal voltage is 100%, three outputs of the signal processing circuit 220A all transition to a low level, and thus, the adjustment voltage set by the voltage comparator 320 is brought to a value corresponding to the normal state (14.5V) which is determined by a resistance ratio of the resistors 356 and 357, and the resistor ratio of the resistors 358 and 359. At the time, from the duty/voltage converter circuit 300, a voltage of 5V which is a voltage corresponding to D=100% is output, and therefore, the output of the voltage comparator 302 transitions to a high level, and the output of the OR circuit 310 transitions to a high level. Accordingly, the output of the NOR circuit transitions to a low level, and the transistor 339 is turned off while the transistor 340 is turned on. Thus, the adjustment voltage of 14.5V of the normal state is set by the transistor 341 which is turned ON/OFF by the output of the voltage comparator 320.

When the duty ratio is between a% and be b% shown in FIG. 21, a voltage between 0.5V and 4.5V is output from the duty/voltage conversion circuit 300, and thus, outputs of the voltage comparators 302 and 303 transition to the low level. Thus, the output of the OR circuit 310 also transition to a low level.

An output of the timer circuit 410 transitions to the low level during a predetermined period t1, and the transistor 335 is turned ON while the transistor 336 is turned OFF. Thus, during this period, the reference voltage applied to the plus terminal of the voltage comparator 320 becomes generally 0V, and the adjustment voltage is set to generally 0V.

When the output of the timer circuit 410 transitions to a high level after the predetermined period t1 elapses, the transistor 339 is turned ON and the transistor 340 is turned OFF. Therefore, the transistor 341 is turned OFF and the excitation current controlling circuit 13 is operated by the transistor 342 so as to set the adjustment voltage corresponding to the output state of the voltage comparator 321. Specifically, the adjustment voltage corresponding to the duty ratio of the C terminal voltage is set. For example, when the duty ratio shown in FIG. 23 is 10%, the adjustment voltage is set to generally 11V. When the duty ratio shown in FIG. 24 is 90%, the adjustment voltage is set to generally 15V.

Next, when the C terminal voltage rises, the timer circuit 410 is reactivated, transitioning its output to the low level. At that time, the transistor 335 is turned OFF, the transistor 336 is turned ON, and the transistor 337 is turned OFF. Therefore, the adjustment voltage is determined by each resistance value of resistors 355, 356, 357, 359 and 359, and becomes 20V, for example.

When the C terminal voltage falls, the transistor 335 is turned ON, and the transistor 336 is turned OFF. Thus, the reference voltage applied to the plus terminal of the voltage comparator 320 becomes almost 0V, and the adjustment voltage becomes generally 0V.

When the duty ratio of the C terminal voltage is 0%, three outputs of the signal processing circuit 220A all transition to a low level. At that time, the output of the duty/voltage conversion circuit 300 becomes 0V, which is a voltage corresponding to D=0%. Additionally, the output of the voltage comparator 303 transitions to the high level, and the output of the OR circuit 310 transitions to the high level. Accordingly, the output of the NOR circuit 311 transitions to a low level, so that the transistor 339 is turned OFF, and the transistor 340 is turned ON. The transistor 338 is turned ON. Therefore, the adjustment voltage is determined by each resistance value of resistors 356, 357, 358, 359, and 360, and is brought to 12.8V for example. If an operation time of the timer circuit 410 is set to several ms, there will be substantially no influence by the voltage fluctuation.

FIG. 25 is a timing diagram showing another operation procedure of the vehicular power generation controlling device 1E according to the present embodiment. A specific example is shown in which the C terminal voltage repeatedly changes its state at an interval shorter than an operation time of the timer circuit 410 (Ts<t0).

Because the timer circuit 410 is consistently in the operation state, an output of the inverter circuit 312 transitions to a high level, and an output of the NOR circuit 311 transitions to a low level. Accordingly, the transistor 340 is turned On and the transistor 342 is turned OFF, and thus, the excitation current controlling circuit 13 is operated by the transistor 341 and is controlled so as to correspond to the output state of the voltage comparator 320. Specifically, the adjustment voltage is set to generally 0V when the C terminal voltage is at a low level, and to 20V when at a high level. Moreover, it is possible to operate the vehicular generator 2 in the power generation suspending state when the duty ratio is close to 0%, and in the forced power generation state when it is close to 100%.

As such, by using the vehicular power generation controlling device 1E of the present embodiment, it is possible to change the adjustment voltage in a wider range than in conventional techniques. For example, it becomes possible to supply current to the high voltage load such as an electric heating catalyst load. Moreover, it is possible to provide compatibility with a conventional vehicular power generation controlling device. Particularly, because the state change in the duty signal is used, it is possible to set the adjustment voltage without compromising conventional duty/voltage conversion accuracy. Moreover, because the output voltage of the vehicular generator 2 can be controlled without providing a special controller for a high voltage, a cost reduction is realized. Furthermore, even if the signal line is opened or short-circuited, a fail-safe function for performing an autonomous control under the normal state can be implemented.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A controlling method of a vehicular generator for controlling a power generation state of a vehicular generator comprising the steps of:

transmitting a setting signal to a vehicular power generation controlling device from an external controller;

allocating to a steady state of the setting signal, a command of a first controlling value on an external controller side;

allocating to a change state of the setting signal, a command of a second controlling value; and setting the second controlling value as an output controlling value of the vehicular generator during a predetermined period after detecting the change state of the setting signal;

wherein the second controlling value is different from the first controlling value.

2. A vehicular power generation controlling device, comprising:

an external signal identifying means for identifying a steady state and a change state of a setting signal transmitted from an external controller, and a controlling value setting means for setting a second setting value different from a first controlling value corresponding to the steady state during a predetermined time after a change state of the setting signal is detected by the external signal identifying means.

3. A vehicular power generation controlling device, comprising:

an external signal identifying circuit for identifying a steady state and a change state of a setting signal transmitted from an external controller, and an adjustment voltage controlling circuit for setting a second controlling value as an adjustment voltage of a vehicular generator, the second controlling value being different from a first controlling value corresponding to the steady state, during a predetermined time after the change state of the setting signal is detected by the external signal identifying circuit, wherein a power generation state of the vehicular generator is controlled by using the first controlling value and the second controlling value set by the adjustment voltage controlling circuit.

4. A vehicular power generation controlling device according to claim 3, wherein the external signal identifying circuit comprises a voltage comparing means for detecting the setting signal input to a terminal for receiving an external signal by comparing a predetermined reference value and a voltage level of the terminal, and a changing state detection means for detecting a change state of the setting signal detected by the voltage comparing means.

5. A vehicular power generation controlling device according to claim 4, wherein the adjustment voltage controlling circuit has a timer means for starting a measuring of a set period when the change state is detected by the external signal identifying circuit, and sets the second controlling value as the adjustment voltage until a measuring operation by the timer means is finished.

6. A vehicular power generation controlling device according to claim 5, wherein the first controlling value corresponds to a power generation state under a steady state of the vehicular generator.

7. A vehicular power generation controlling device according to claim 6, wherein the second controlling value corresponds to a power generation suspension state of the vehicular generator.

8. A vehicular power generation controlling device according to claim 6, wherein the second controlling value corresponds to a forced power generation state of the vehicular generator.

9. A vehicular power generation controlling device according to claim 5, wherein the setting signal has a plurality of steady state voltage levels, and the adjustment voltage controlling circuit sets a plurality of first controlling values corresponding to each of the plurality of steady state voltage levels.

10. A vehicular power generation controlling device according to claim 5, wherein the external signal identifying circuit distinguishes, when identifying the change state, a first change state corresponding to a rising of the setting signal and a second change state corresponding to a falling thereof, and the adjustment voltage controlling circuit sets the second controlling value corresponding to the first change state different from the second controlling value corresponding to the second change state.

11. A vehicular power generation controlling device according to claim 10, wherein one of the second controlling value corresponding to the first change state and the second controlling value corresponding to the second change state corresponds to a power generation suspension state of the vehicular generator while the other corresponds to a force power generation state of the vehicular generator.

12. A vehicular power generation controlling device according to claim 10, wherein the setting signal has a predetermined duty ratio, one of the second controlling value corresponding to the first change state and the second controlling value corresponding to the second change state corresponds to a power generation suspension state of the vehicular generator while the other corresponds to a force power generation state of the vehicular generator, and the first controlling value corresponding to the steady state is set to a value corresponding to the duty ratio.

13. A vehicular power generation controlling device according to claim 5, wherein the adjustment voltage controlling circuit sets, when in the steady state where the change state is not detected by the external signal identifying circuit, the first controlling value as an adjustment voltage, the first controlling value having a voltage value being continuously changeable by corresponding to a voltage level of the setting signal.

14. A vehicular power generation controlling device comprising:

an external signal identifying circuit for identifying a steady state and a change state of a setting signal transmitted from an external controller, an adjustment voltage controlling circuit for setting a second controlling value as an adjustment voltage of a vehicular generator, the second controlling value being different from a first controlling value corresponding to a power generating state under a steady state of the vehicular generator, during a predetermined time after the change state of the setting signal is detected by the external signal identifying circuit, a voltage comparing means, incorporated with the external signal identifying circuit, for detecting the setting signal input to a terminal for receiving an external signal by comparing a predetermined reference value and a voltage level of the terminal, and a changing state detection means, incorporated with the external signal identifying circuit, for detecting a change state of the setting signal detected by the voltage comparing means, wherein the adjustment voltage controlling circuit has a timer means for starting a measuring of a set period when the change state is detected by the external signal identifying circuit, and sets the second controlling value as the adjustment voltage until a measuring operation by the timer means is finished, wherein the external signal identifying circuit distinguishes, when identifying the change state, a first change state corresponding to a rising of the setting signal and a second change state corresponding to a falling thereof, wherein the setting signal has a predetermined duty ratio, one of the second controlling value corresponding to the first change state and the second controlling value corresponding to the second change state corresponds to a power generation suspension state of the vehicular generator while the other corresponds to a force power generation state of the vehicular generator, and wherein the first controlling value corresponding to the steady state is set to a value corresponding to the duty ratio.

15. An external controller, wherein a power generation state of a vehicular generator is controlled by transmitting a steady state of a setting signal expressing a command of a first controlling value and a change state of the setting signal expressing a command of a second controlling value for changing the first controlling value for a predetermined time.

* * * * *